(12) United States Patent
Lefeber et al.

(10) Patent No.: US 12,486,890 B2
(45) Date of Patent: Dec. 2, 2025

(54) MECHANICAL INTERCONNECTION OF MULTIPLE ROTATABLE DEVICES (MIMRD)

(71) Applicant: VRIJE UNIVERSITEIT BRUSSEL, Elsene (BE)

(72) Inventors: Dirk Lefeber, Sint-Agatha-Rode (BE); Stein Crispel, Saintes (BE); Pablo López Garcia, Brussels (BE)

(73) Assignee: VRIJE UNIVERSITEIT BRUSSEL, Elsene (BE)

( * ) Notice: Subject to any disclaimer, the term of this patent is extended or adjusted under 35 U.S.C. 154(b) by 260 days.

(21) Appl. No.: 18/038,375

(22) PCT Filed: Nov. 23, 2021

(86) PCT No.: PCT/IB2021/060858
§ 371 (c)(1),
(2) Date: May 23, 2023

(87) PCT Pub. No.: WO2022/112937
PCT Pub. Date: Jun. 2, 2022

(65) Prior Publication Data
US 2024/0093767 A1    Mar. 21, 2024

(30) Foreign Application Priority Data

Nov. 24, 2020 (GB) ..................... 2018444

(51) Int. Cl.
*F16H 48/06* (2006.01)
*F16H 37/08* (2006.01)
(Continued)

(52) U.S. Cl.
CPC ............. *F16H 37/08* (2013.01); *F16H 48/06* (2013.01); *F16H 57/082* (2013.01); *F16H 57/10* (2013.01)

(58) Field of Classification Search
CPC ........ F16H 37/08; F16H 48/06; F16H 57/082; F16H 57/10; F16H 1/28; F16H 1/22;
(Continued)

(56) References Cited

U.S. PATENT DOCUMENTS 7,399,246 B2 *  7/2008  Holmes .................. B60K 6/547
                                                    475/5
9,643,481 B2 *  5/2017  Goleski ................. B60K 6/387
(Continued)

FOREIGN PATENT DOCUMENTS

CN       105276106 A      1/2016
WO   WO-2020186399 A1 *  9/2020  ............. B60K 6/365
WO       2020/211519 A1  10/2020

OTHER PUBLICATIONS

International Search Report & Written Opinion to corresponding PCT Application No. PCT/IB2021/060858 dated Feb. 1, 2022.

*Primary Examiner* — Justin Holmes
(74) *Attorney, Agent, or Firm* — Dinsmore & Shohl LLP

(57) ABSTRACT

Mechanical interconnection of multiple rotatable devices that includes: a gear train, at least three rotatable devices, one or more first stages, and one or more second stages, a first element, i.e. a geared element or a planet carrier, of one of the second stages forming a torque resisting means being blocked or impeded in a controllable way. The third rotatable device interacting with a second element, i.e. a gearwheel, or a planet carrier, of one of the second stages.

20 Claims, 10 Drawing Sheets

(51) Int. Cl.
*F16H 57/08* (2006.01)
*F16H 57/10* (2006.01)

(58) Field of Classification Search
CPC .... F16H 48/05; F16H 9/26; A61F 2002/6836; B25J 9/102; B60K 6/365; F03D 15/00
See application file for complete search history.

(56) References Cited

U.S. PATENT DOCUMENTS

| | | | |
|---|---|---|---|
| 2010/0167862 A1* | 7/2010 | Hoehn | F16H 48/36 475/205 |
| 2012/0196721 A1* | 8/2012 | He | B60K 6/52 475/5 |
| 2014/0171247 A1* | 6/2014 | Puiu | F16H 3/728 475/5 |
| 2019/0093737 A1 | 3/2019 | Pan et al. | |

\* cited by examiner

MECHANICAL INTERCONNECTION OF MULTIPLE ROTATABLE DEVICES (MIMRD)

CROSS-REFERENCE TO RELATED APPLICATIONS

The present application is the National Phase entry of International Patent Application No. PCT/IB2021/060858 filed Nov. 23, 2021, which claims priority to Great Britain Patent Application No. 2018444.6 filed Nov. 24, 2020, the entire contents of which are hereby incorporated by reference into this application.

TECHNICAL FIELD

The present disclosure relates to a mechanical interconnection of multiple rotatable devices (MIMRD).

In particular, the present disclosure relates to such a MIMRD, comprising at least a gear train for transmitting or interchanging speed and/or torque between the rotatable devices and at least three rotatable devices interconnected or interacting with the gear train for delivering rotational power to and/or receiving rotational power from the gear train.

A MIMRD of this present disclosure can be used in all kinds of applications.

For example, it can be applied in situations with very large dimensions, high torques and loads, such as in a windturbine, a vehicle gear box or in a transmission of a power production plant.

On the other hand, it can also be applied in situations where dimensions are very small and torques and loads are relatively small, but possibly still quite high for the small space available.

Such a MIMRD can for example be used for driving parts of a prosthesis or a joint in robotics.

One or more of the rotatable devices of a MIMRD of the present disclosure can be rotatable devices, such as a motor, an actuator, a wind turbine or the like, which are intended for driving the gear train and/or other rotatable devices.

One or more of the rotatable devices of a MIMRD according to the present disclosure can also be rotatable devices, such as a generator, a passive load or the like, which are intended for being driven by the gear train and/or other rotatable devices.

In still other cases one or more of the rotatable devices can be a device that is capable of being both during use, i.e. dependent on the circumstances it can be a device that drives the gear train and in other circumstances a device that can be driven by the gear train.

A motor-generator is an example of such a dual use rotatable device.

In some embodiments, the rotatable devices of the present disclosure are all one of the following types: a motor, an actuator, a generator, a reversible motor-generator electrical machine, a passive load, a wind mill or wind turbine, or a water mill or water turbine.

In still other wordings, it can be said that each rotatable device can serve as an input for the gear train, when driving the gear train, or as an output, when being driven by the gear train, and it is even possible that such a rotatable device during use serves as an input or as an output dependent on the circumstances.

It is clear that the gear train transmits power between the rotatable devices and a certain transmission ratio is hereby realised, which is as a rule variable and dependent on changing parameters, such as a rotational speed of one or more of the rotatable devices.

In a typical form of execution of a MIMRD in accordance with the present disclosure, one or more rotatable devices are used for determining the conditions of, for example, speed and/or torque at one or more other rotatable devices of the MIMRD.

For example, in a typical MIMRD of the present disclosure, rotatable devices serving as an input device are used for determining the conditions at rotatable devices which serve as an output device.

Without restricting the present disclosure to this example, a MIMRD of the present disclosure can be executed as a continuously variable transmission (CVT) and even as a so-called infinitely variable transmission (IVT), which is a specific type of the more general group of continuously variable transmissions.

In contrast with other mechanical transmissions, which only provide a discrete number of transmission ratios, a CVT is a transmission that can change seamlessly through a continuous range of effective gear ratios.

What characterizes an IVT within the more general term of continuously variable transmissions (CVT) is its capacity to provide additionally a theoretically infinite torque to speed ratio with its output at zero speed.

This means that a MIMRD executed as IVT can stop the power transmission to one or more rotatable devices which serve as output device, while still receiving positive power from one or more rotatable devices which serve as input device.

As a consequence, such a MIMRD which is executed as an IVT can provide a high torque at an output, while the output speed is zero or nearly zero.

This is a very interesting characteristic for example for delivering a starting torque, i.e. in conditions where a high torque is needed at low or nearly zero speed.

BACKGROUND

According to the state of the art some types of MIMRDs are known, even in an execution as infinitely variable transmissions, but they have still some limitations for certain applications.

A first disadvantage of the known types of MIMRDs is their complexity and their lack of compactness.

Another disadvantage of the known MIMRDs is their lack of efficiency and the limited torque that can be transmitted, as well as the fact that the transmission ratios that can be achieved are relatively restricted.

The present disclosure aims at a MIMRD which does not show one or more of the above disadvantages and possibly also other disadvantages.

SUMMARY

In particular, it is an aim of the present disclosure to provide such a MIMRD which is capable of achieving high transmission ratios in a space of relatively limited size, while maintaining a high level of efficiency.

Another aim of the present disclosure is to provide some techniques which allow to adapt the design of a MIMRD in function of the intended application or purpose, especially for obtaining high transmission ratios and for realizing efficient controlling by which the transmission ratio can be adapted at will.

Another aim of the present disclosure is to provide some insight into how to build an efficient MIMRD and to provide functional building blocks for composing such a MIMRD with the required characteristics.

Still another aim of the present disclosure is to allow the design and realisation of a MIMRD suitable for application in the most diverse domains, such as in any mechanical actuator, in cars or other vehicles, electrical, hybrid or non-electrical devices or vehicles, windmills, exoskeletons, robotic arms and prosthetic limbs and so on.

It is in particular also an aim of the present disclosure to provide a MIMRD suitable for application in the domain of prostheses and orthoses and of robotics, wherein small drivers are used for actuation of an artificial joint or joints and wherein the range of torques to be transmitted as well as the range of transmission ratios hereby applied is very wide, while in this specific domain the need for a very smoothly functioning solution which is at the same time reliable and very compact, is very high.

To that aim, the present disclosure relates to a MIMRD of the above described type, wherein the gear train of the mechanical interconnection of multiple rotatable devices comprises:
  one or more first stages; and
  one or more second stages,
wherein each first stage is coupled to one of the one or more second stages and is a speed reducer or a speed increaser serving as a pre-gearing for connecting a rotatable device to the concerned second stage, at least two rotatable devices, i.e. a first and a second rotatable device of the at least three rotatable devices, being connected to a second stage and at least one of the first and the second rotatable device connected to the concerned second stage by a first stage; wherein each second stage is a differential gearing comprising a planetary gear train system which is executed in a quasi-duplicated form composed of an input side and an output side, comprising respectively a first set and a second set of planetary gearing, which are mutually quasi identical but slightly different from one another, whereby the first set and the second set together comprises at least three duo's of two elements of the same type, i.e. a geared element or a planet carrier, whereby one element of each duo is part of the first set while the other element of this duo is part of the second set, whereby each duo is of a different type of element, whereby the at least three duo's comprise at least a duo of planet carriers and a duo of planet gears, whereby the first set and the second set of planetary gearing interact respectively with first and second interacting gearing of respectively the input side and the output side and which sets are supported in a rotatable manner either each on their own separated planet carrier or together on a common planet carrier, each set of planetary gearing being composed of a number of planetary gearing elements which are disposed circumferentially and spaced from one another on their supporting planet carrier, at least a first duo of the aforementioned at least three duo's being linked to form a linking mechanism between the first set and the second set of planetary gearing for transmission of torque and/or speed between the input side and the output side;
wherein at least a first element, i.e. a geared element or a planet carrier, of a second duo of the aforementioned at least three duo's of at least one of the second stages is forming a torque resisting or torque controlling means in that it is permanently blocked or impeded in a controllable way or provides a controllable torque to the gear train of the MIMRD; and,
wherein at least the third rotatable device of the at least three rotatable devices is interconnected or interacting with a second element, i.e. a gearwheel or a planet carrier, of the aforementioned second duo of at least one of the second stages,
whereby a differential gain-K, or K, of the operating pitch diameters of the elements of the afore-mentioned at least three duo's fulfils:

$$K \in [0,7-1[\cup]1-1,4]$$

whereby the differential gain-K is defined as:
$K=(D2,a/D1,a)*(D1,b/D2,b)$ for ring or sun differential gearings,
whereby:
  D2,a is the operating pitch diameter of the element of the aforementioned second duo belonging to the first set (16) of planetary gearing;
  D1,a is the operating pitch diameter of the element of the aforementioned first duo belonging to the first set (16) of planetary gearing;
  D2,b is the operating pitch diameter of the element of the aforementioned second duo belonging to the second set (17) of planetary gearing;
  D1,b is the operating pitch diameter of the element of the aforementioned first duo belonging to the second set (17) of planetary gearing
whereby the differential gain-K is defined as:
$K=(D1,a/(D2,a-D3,b))*((D2,b-D3,b)/D1,b)$ for carrier differential gearings, whereby:
  D2,a is the operating pitch diameter of the element of the aforementioned second duo belonging to the first set (16) of planetary gearing;
  D1,a is the operating pitch diameter of the element of the aforementioned first duo belonging to the first set (16) of planetary gearing;
  D2,b is the operating pitch diameter of the element of the aforementioned second duo belonging to the second set (17) of planetary gearing;
  D1,b is the operating pitch diameter of the element of the aforementioned first duo belonging to the second set (17) of planetary gearing;
  D3,a is the operating pitch diameter of the element of the afore-mentioned third duo belonging to the first set (16) of the planetary gearing when the first duo comprises a set of two rings;
  D3,b is the operating pitch diameter of the element of the afore-mentioned third duo belonging to the second set (17) of the planetary gearing when the first duo comprises a set of two rings;
  D3,a is the negative of the operating pitch diameter of the element of the afore-mentioned third duo belonging to the first set (16) of the planetary gearing when the first duo comprises a set of two sun gears;
  D3,b is the negative of the operating pitch diameter of the element of the afore-mentioned third duo belonging to the second set (17) of the planetary gearing when the first duo comprises a set of two sun gears;
whereby the differential gain-K is defined as:
$K=(D2,a/(D3,b))\ ((D3,b)/D2,b)$ for complex carrier differential gearings,
whereby:
  D2,a is the operating pitch diameter of the element of the aforementioned second duo belonging to the first set (16) of planetary gearing;
  D2,b is the operating pitch diameter of the element of the aforementioned second duo belonging to the second set (17) of planetary gearing;
  D3,a is the operating pitch diameter of the element of the afore-mentioned third duo belonging to the first set (16) of the planetary gearing, whereby the third duo is a duo of planet gears;

D3,b is the operating pitch diameter of the element of the afore-mentioned third duo belonging to the second set (17) of the planetary gearing, whereby the third duo is a duo of planet gears.

Such a MIMRD in accordance with the present disclosure has a lot of advantages, since it is composed of specific building blocks which provide the right functionality at the right place in the gear train.

First of all, the gear train of such a MIMRD comprises one or more second stages which are executed in a quasi-duplicated form comprising an input side and an output side, respectively with a first set and a second set of nearly identical planetary gearing which are linked to one another by a linking mechanism.

'Quasi-duplicate' in this case means that the input side, comprising the first set, and the output side, comprising the second set, must be of the same configuration.

This means that they must contain the same type of elements, i.e. the same types of gearwheels or planet carriers which are placed in an identical set-up.

Additionally, 'quasi-duplicate' also means that the size and other parameters of these elements such as number of teeth, module, profile shift, operating pitch, radii of planet carrier, etc., can actually be different and in fact will for at least one of such elements be different.

Indeed, the skilled person will immediately understand that a second stage executed in an identical form will in fact not work at all.

In other words: the term 'quasi-duplicate' excludes symmetry.

With 'mutually quasi identical but slightly' is meant here that the three sets of the aforementioned duo's comply with the requirement that the 'differential gain-K' as defined above falls within the range [0,7–1[∪]1–1,4].

Note that by excluding 1 from this range, i.e. the differential gain-K cannot be 1, it is avoided that symmetry exists.

It is clear that the term 'quasi-duplicate' and 'mutually quasi identical but slightly different' are closely related.

The term 'operating pitch diameter' used in the calculation of the 'differential gain-K' is known by the skilled person and as defined in 'Dudley's Handbook of practical gear design and manufacture' by S. P. Radzevich ISN 978-1-4398-6602-3 (eBook). For the calculation of the 'operating pitch diameter' of a carrier, we refer to the examples below for FIGS. 5 and 6.

According to an embodiment of the present disclosure, the 'differential gain-K', or K, of the operating pitch diameters of the elements of the afore-mentioned at least three duo's fulfils:

$K \in [0,8–1[\cup]1–1,2]$.

In some embodiments, the 'differential gain-K', or K, of the operating pitch diameters of the elements of the afore-mentioned at least three duo's fulfils:

$K \in [0,9–1[\cup]1–1,1]$.

In some embodiments: the 'differential gain-K' is as close as possible to 1. This will lead to a high gear ratio when the aforementioned first element of the second duo is permanently blocked or impeded in a controllable way or provides a controllable torque to the gear train of the MIMRD.

In the examples below, some examples of the calculation of the 'differential gain-K' or 'K' will be given. From these examples it will also be clear how the aforementioned 'operating pitch diameter' must be calculated when the element is a carrier instead of a geared element.

As will be demonstrated further in the text, with such a kind of quasi-duplicated mechanism very high transmission ratios can be obtained, for example by blocking or impeding the rotation of an element in the mechanism of such a second stage or by setting the torque on such an element.

The purpose of the first element in the MIMRD, which is forming a torque resisting or torque controlling means, is to provide this blocking or impeding of an element of a second stage or to set the amount of torque on that element.

The one or more first stages are intended as a pre-gearing by which the first rotatable device and/or the second rotatable devices and possible other rotatable devices of the MIMRD are connected to their second stage.

This first stage or these first stages ensure that the rotational speed and/or torque of the concerned rotational device is brought within a range suitable for being fed to the second stage, by decreasing or increasing the rotational speed and/or torque at the output of the concerned rotatable device.

Or, it can also be the other way around, when such a first stage ensures that the rotational speed and/or torque of the second stage is brought within a range suitable for being fed to the rotatable device connected to the second stage through the concerned first stage.

In a typical example the first and second rotatable devices are electric actuators which rotate at a very high speed and which deliver only low torque.

In such a case, first stages can be used in order to reduce this high rotational speed and increase the torque to bring them within a range that is suitable for driving the concerned second stage at its input side.

The third rotatable device of the MIMRD is interconnected or interacting with at least one second element of the MIMRD, i.e. a gearwheel or a planet carrier, of at least one of the second stages.

This second element of the MIMRD can be considered as the complement of the first element which is forming the torque resisting means or torque controlling means.

So, the torque resisting means or torque controlling means play an important role, if not the most important role, in determining how the third rotatable device interacts with the gear train of the MIMRD.

Furthermore, each one of the rotatable devices itself can serve as an input or output of the MIMRD and can possibly be executed in a controllable way, for example as a driver or engine of which the rotational speed and torque can be controlled or on the contrary as a driven element of which the load can be controlled and so on.

It is clear that all these characteristics combined result in a mechanical interconnection of rotatable devices wherein the interaction between the different rotatable devices can be varied a lot in a very quick and flexible way, not in the least for as far as the transmission ratio is concerned, while ensuring a very high reliability of the transmission.

The transmission ratio can be set in a seamless way, by controlling some of the rotatable devices and/or the torque resisting means or torque controlling means, so that the MIMRD can also serve as a CVT or IVT, as will become clear from the practical examples further in the text.

In a possible embodiment of a mechanical interconnection of multiple rotatable devices (MIMRD) in accordance with the present disclosure, the first rotatable device and the second rotatable device are both connected to a second stage by a first stage.

Such an embodiment of a MIMRD of the present disclosure is for example very interesting for realizing a MIMRD which is executed almost symmetrically and wherein the first and second rotatable devices are used for controlling transmission of power and speed to the third rotatable device.

In some embodiments of a mechanical interconnection of multiple rotatable devices (MIMRD) in accordance with the present disclosure, the MIMRD comprises a pair of second stages, which are, for purposes of referencing to them hereafter, called primary second stage and secondary second stage, which are respectively connected to the first rotatable device and the second rotatable device of the MIMRD, each through a first stage of a pair of first stages of the MIMRD, these second stages being linked to one another.

Such an embodiment of a MIMRD in accordance with the present disclosure is very interesting, since it comprises a pair of second stages which are each connected to one of the first and second rotatable devices through a first stage and which are mechanically linked to one another.

Each second stage of the pair of second stages is itself executed in a quasi-duplicated form with a first and second set of planetary gearing.

By including a pair of second stages in the MIMRD this quasi-duplicated form of the second stage is doubled, which results in an incredibly increased capacity of varying the transmission ratio of the MIMRD.

As already explained here-before, the first stages contribute to an even more increased capacity of providing a very high or on the contrary a very low overall transmission ratio of the MIMRD.

The primary second stage and the secondary second stage can for example be linked to one another in one of the following ways:
 a) by a compound stage linking gearwheel of which a first compound stage linking gearwheel component is interacting with one of the sets of planetary gearing of the primary second stage and of which a second compound stage linking gearwheel component is interacting with one of the sets of planetary gearing of the secondary second stage; or,
 b) by interconnection of a gear wheel of the primary second stage which interacts with a set of planetary gearing of that primary second stage and a planet carrier of the secondary second stage of that pair of second stages.

In some embodiments of a mechanical interconnection of multiple rotatable devices (MIMRD) in accordance with the present disclosure, additionally the other set of planetary gearing of the primary second stage is interacting with a gearwheel which is forming a torque resisting or torque controlling means and a set of planetary gearing of the secondary second stage is interacting with the third rotatable device.

Such an embodiment of a MIMRD in accordance with the present disclosure has a rather symmetrical shape, with exception of the torque resisting means or torque controlling means and of the third rotatable device.

Indeed, the first and second rotatable device are each connected to one of the pair of second stages through a first stage and the second stages are interlinked, while the primary second stage is interacting with the torque resisting means and the secondary second stage is interacting with the third rotatable device.

In such a mechanical configuration the interaction between the first and second rotatable devices and the third rotatable device can be varied hugely for example by setting the speed of the first and second rotatable devices or by blocking or unblocking the torque resisting means or setting the torque of the torque controlling means, while on the other hand the structure of the configuration remains compact and is rather intelligible due to its symmetric characteristics.

The intelligibility of the configuration makes it also quite manageable and it's behaviour can therefore be predicted rather easily.

BRIEF DESCRIPTION OF THE DRAWINGS

With the intention of better showing the characteristics of the present disclosure, hereafter, as an example without any restrictive character whatsoever, some embodiments of a mechanical interconnection of multiple rotatable devices (MIMRDs) according to the present disclosure, are described, with reference to the accompanying illustrations, wherein.

DETAILED DESCRIPTION

Figure 1:
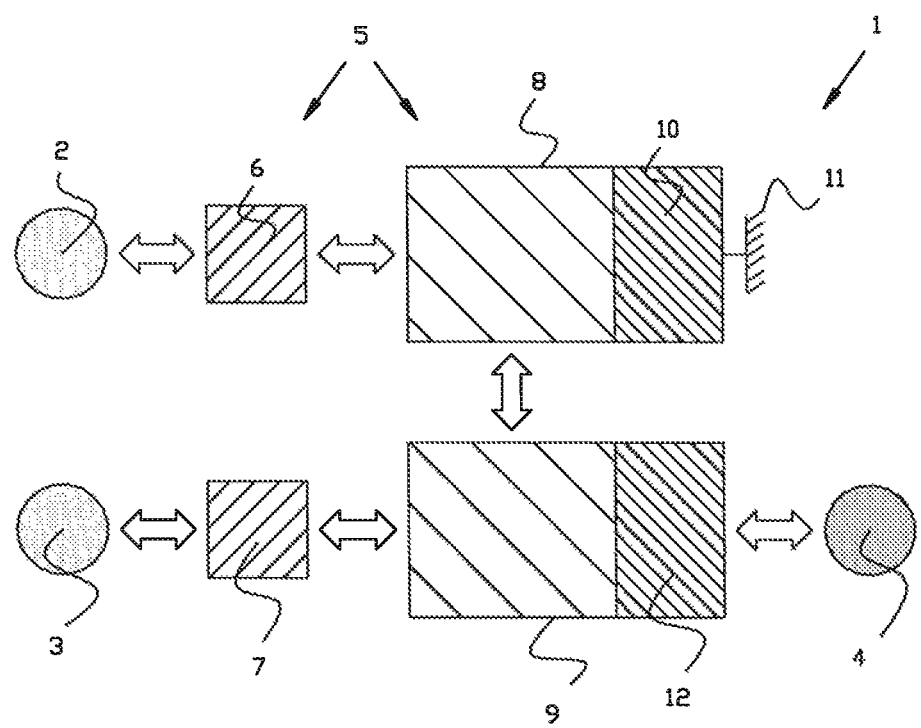
FIG. 1 is a schematic representation of a rather general embodiment of a MIMRD in accordance with the present disclosure.

FIG. 1 is a general schematic representation of a mechanical interconnection of multiple rotatable devices (MIMRD) 1 in accordance with the present disclosure, different building blocks by which such a MIMRD 1 can be composed being illustrated without their further internal features.

The MIMRD 1 comprises at least three rotatable devices 2, 3 and 4 which are interconnected or interacting with one another by of the gear train 5.

These rotatable devices 2 to 4 deliver rotational power to and/or receive rotational power from the gear train 5 and speed and/or torque is transmitted or interchanged between the rotatable devices 2 to 4 by the gear train 5.

The rotatable devices 2 to 4 can be of all kind and can for example be electrical actuators or generators, or a wind turbine and so on.

The gear train 5 of the MIMRD 1 comprises one or more first stages and one or more second stages.

In FIG. 1 there are two first stages 6 and 7, and two second stages 8 and 9, which are linked to one another for transmitting speed and torque.

Each first stage 6 or 7 is coupled to one of the second stages, respectively 8 and 9, and is a speed reducer or a speed increaser serving as a pre-gearing for connecting a rotatable device, in this case respectively rotatable device 2 and rotatable device 3, to their corresponding second stage 8 and 9.

According to the present disclosure in the MIMRD 1 there are at least two rotatable devices, i.e. a first rotatable device 2 and a second rotatable device 3 of the at least three rotatable devices 2 to 4, which are connected to a second stage.

At least one of this first rotatable device 2 and this second rotatable device 3 is connected to the concerned second stage by a first stage, but in FIG. 1 both rotatable devices 2 and 3 are connected to their second stage 8 and 9 by a first stage, respectively first stage 6 and first stage 7.

Furthermore, according to the present disclosure, at least a first element 10, which is a geared element or a planet carrier, of at least one of the second stages, is forming a torque resisting means 11 in that it is permanently blocked or impeded in a controllable way or a torque controlling means 11, which allows to set or control the torque on the implicated first element 10.

In this example of FIG. 1 the second stage 8 comprises the first element 10 that is forming a torque resisting means 11 by being fixedly connected to the ground.

According to the present disclosure the third rotatable device 4 of the at least three rotatable devices 2 to 4 of the MIMRD 1 is interconnected or interacting with at least one second element 12, which is also a gearwheel or a planet carrier, of at least one of the second stages 8 or 9, i.e. of the second stage 9 in this case.

Figure 2:
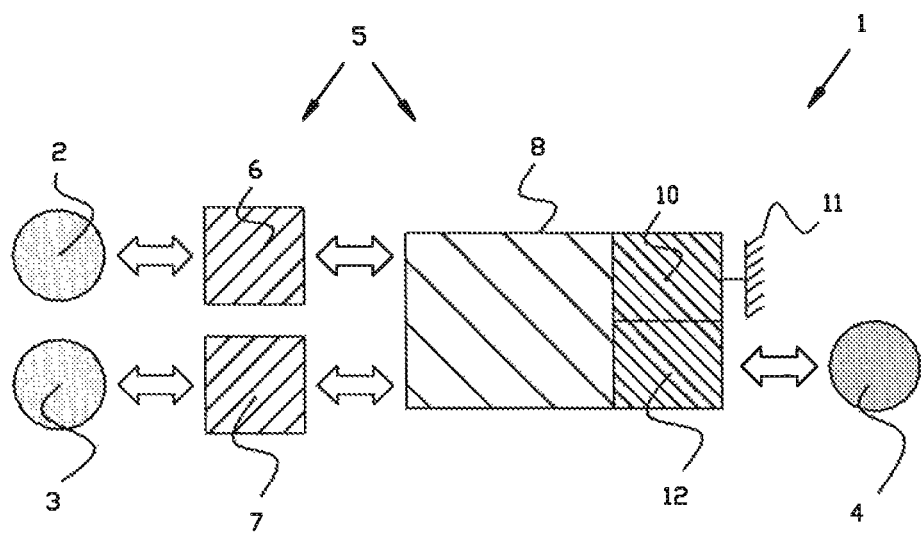
FIG. 2 is a schematic view of an embodiment of a MIMRD in accordance with the present disclosure in which less elements are incorporated.

FIG. 2 illustrates very schematically an alternative embodiment of a MIMRD 1 in accordance with the present disclosure, wherein this time the MIMRD 1 comprises only one second stage 8, the first rotatable device 2 and the second rotatable device 3 being connected to this single second stage 8 each by a first stage, respectively first stage 6 and first stage 7.

The single second stage 8 comprises the first element 10 serving as a torque resisting or torque controlling means 11 as well as the second element 12 which is interacting with the third rotatable device 4.

Figure 3:
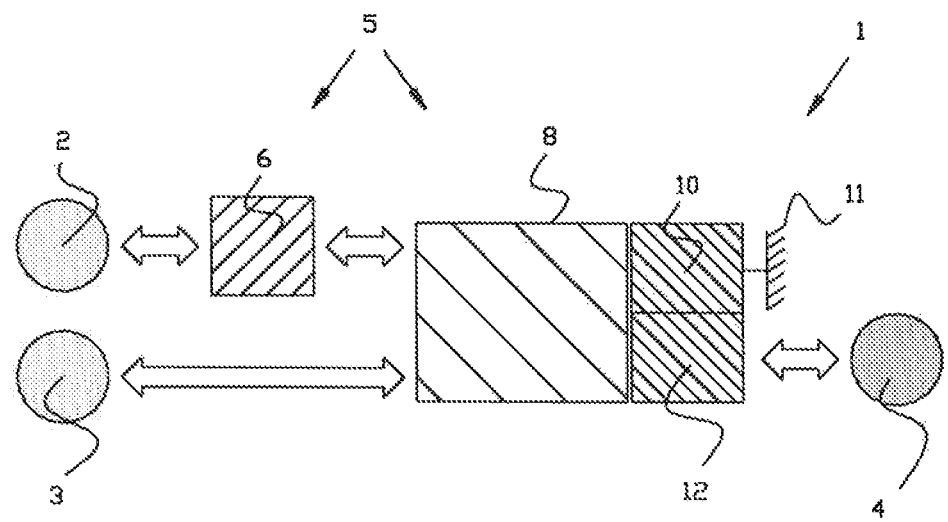
FIG. 3 is a schematic view of another embodiment of a MIMRD in accordance with the present disclosure in which less elements are incorporated.

FIG. 3 illustrates an even more reduced version of the MIMRD 1 of FIG. 2, wherein this time the second rotatable device 3 is directly connected to the second stage 8, without the use of an intermediate first stage.

In other embodiments of a MIMRD 1 of the present disclosure it is of course not excluded to add more rotatable devices, first stages and second stages.

The second stages 8 and 9 form a very important part of the MIMRD 1 and can be executed in very different manners.

Figure 4:
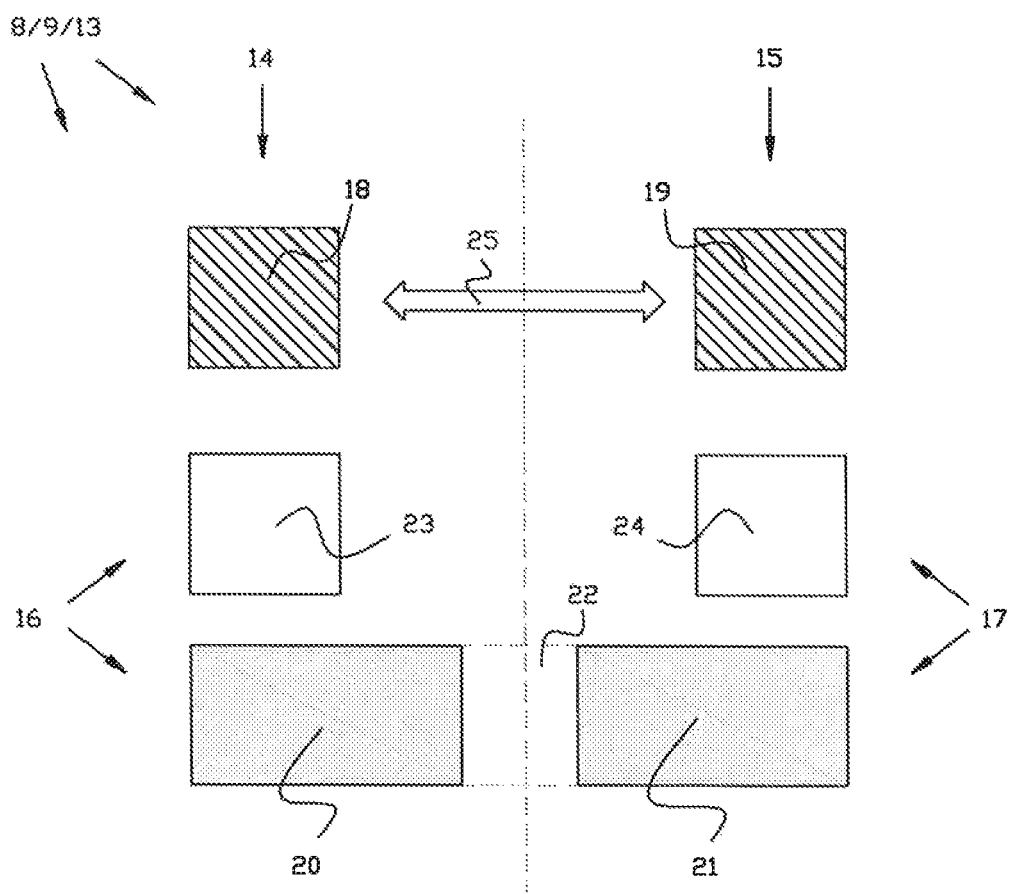
FIG. 4 is a general schematic representation of a second stage of a MIMRD in accordance with the present disclosure.

FIG. 4 illustrates however schematically which elements are for forming such a second stage 8 or 9 of the MIMRD 1.

A second stage 8 or 9 is according to the present disclosure a differential gearing comprising a planetary gear train system 13 which is executed in a quasi-duplicated form composed of an input side 14 and an output side 15.

The input side 14 comprises a first set of planetary gearing 16 and the output side 15 comprises a second set of planetary gearing 17, which are mutually quasi identical but slightly different from one another.

The first set of planetary gearing 16 and the second set of planetary gearing 17 interact respectively with first and second interacting gearing 18 and 19 of respectively the input side 14 and the output side 15.

The sets of planetary gearing 16 and 17 are supported in a rotatable manner either each on their own separated planet carrier 20 and 21 or together on a common planet carrier 22.

Each set of planetary gearing 16 and 17 is furthermore composed of a number of planetary gearing elements 23 and 24 which are disposed circumferentially and spaced from one another on their supporting planet carrier 20, 21 or 22.

The first set of planetary gearing 16 and the second set of planetary gearing 17 are linked to form a linking mechanism 25 for transmission of torque and/or speed between the input side 14 and the output side 15.

Different more practically elaborated embodiments of second stages 8 or 9 are now described in more detail by FIGS. 5 to 14.

In some embodiments of a MIMRD of the present disclosure the first set of planetary gearing of each second stage of the MIMRD is linked with the second set of planetary gearing of that second stage by a linking mechanism.

Figure 5:
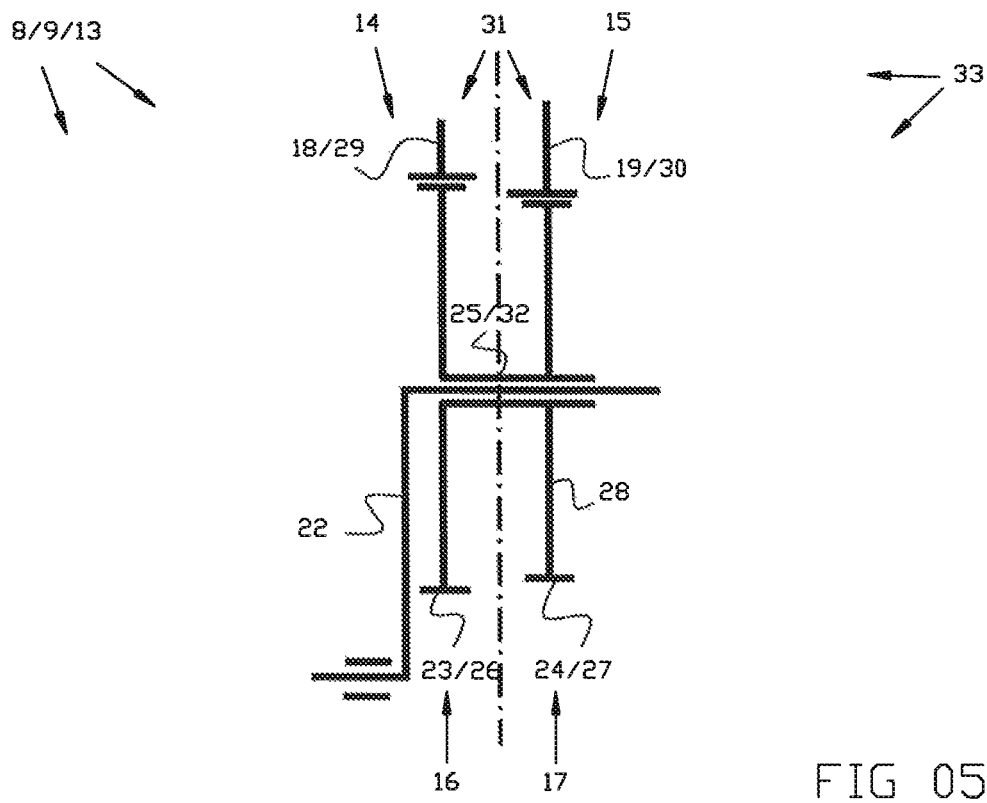
FIG. 5 represents schematically another embodiment of a second stage of a MIMRD in accordance with the present disclosure.

In the case of the second stage 8 or 9 of the MIMRD 1 represented in FIG. 5 the first set of planetary gearing 16 and the second set of planetary gearing 17 each comprise a number of planetary gearing elements 23 and 24 which are of a certain set type.

This set type is such that the concerned set comprises a number of planetary gearwheel components 26 and 27 of a set of compound planetary gearwheels 28.

The first and the second interacting gearing 18 and 19 are of a certain interacting gearing type, which interacting gearing type in the case of FIG. 5 consists each time of a single, separate gearwheel, respectively ring wheel 29 and ring wheel 30.

The first and the second interacting gearing 18 and 19 taken together are therefore in this case a pair of ring wheels 30 and 31.

The linking mechanism 25 between the input side 14 and the output side 15 is formed by a fixed interconnection 32 of corresponding, constitutive components 26 or 27 of the first and second sets of planetary gearing 16 and 17 forming compound planetary linkage gearwheels 28 which are supported on a single common planet carrier 22.

In the case of FIG. 5 the input side 14 and the output side of the second stage 8 or 9 of the MIMRD 1 each comprise an element 29 and 30 forming together a pair 31 of separated, quasi identical, but slightly different elements 29 and 30, so to form a second stage 8 or 9 which is a so-called ring differential gearing 33, since the pair 31 of elements 29 and is a pair 31 of separated ring wheels 29 and 30 forming the first and second interacting gearing 18 and 19, while corresponding components 26 and 27 of the first and second set of planetary gearing 16 and 17 are fixedly interconnected and are supported on a single, common planet carrier 22.

In this case the 'differential gain-K' is calculated as follows (where by $D_x$ is the operating pitch diameter of the element with reference number x in FIG. 5):

$$K=(D_{18/29}/D_{23/26})*(D_{24/27}/D_{19/30})$$

Indeed, the first duo which forms the linking mechanism 25 comprises the elements with reference numbers 23/26 and 24/27, whereas the second duo comprises the elements 18/29 and 19/30. The third duo comprises in this case the common carrier 22.

It is this K value that has to fulfill the requirement that $$K \in [0,7-1 [\cup] 1-1,4]$$

Further note that the following relation is valid:

$$D_{18/29}-D_{23/26}=D_{22}=D_{19/30}-D_{24/27}$$

This relation shows how the operating pitch diameter of the carrier 22 can be determined.

Figure 6:
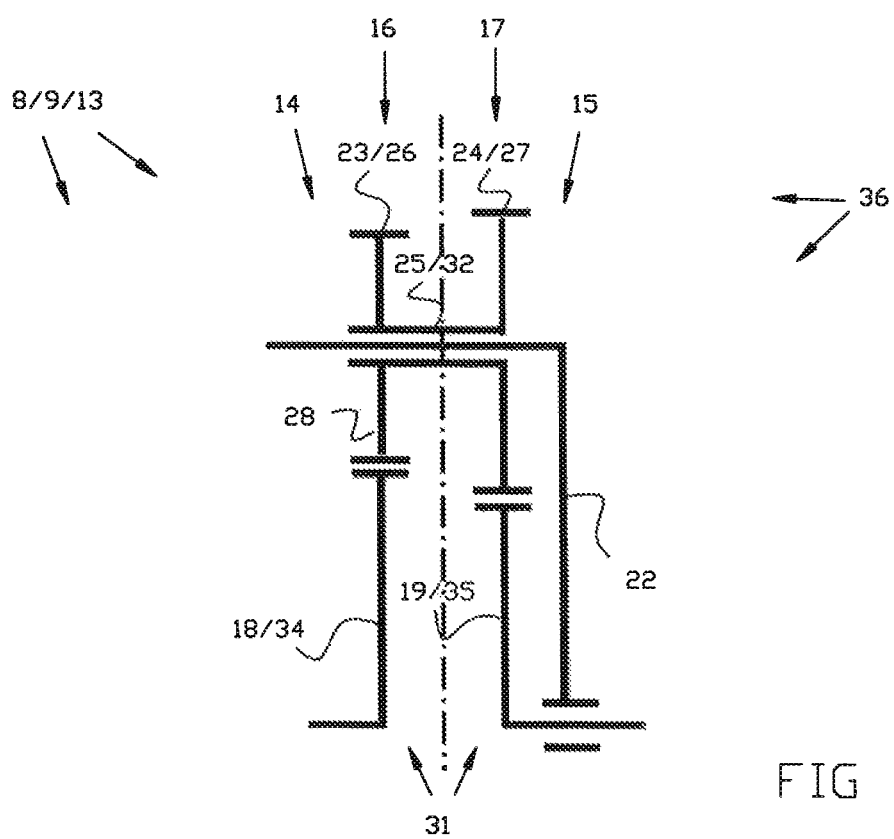
FIG. 6 represents schematically another embodiment of another second stage of a MIMRD in accordance with the present disclosure.

The second stage 8 or 9 of the MIMRD 1 represented in FIG. 6 has a lot of similarities, but is slightly different in that this time the first and second interacting gearing 18 and 19, are each formed by a single, separated gearwheel, which is this time a sun wheel 34 or 35, instead of a ring wheel 29 or 30.

This second stage 8 or 9 constitutes therefore a so-called sun differential gearing 36 since it comprises a pair 31 of separated sun wheels 34 and 35 forming the first and second interacting gearing 18 and 19, while corresponding components 26 and 27 of the first and second set of planetary gearing 16 and 17 are fixedly interconnected and are supported on a single, common planet carrier 22.

In this case the 'differential gain-K' is calculated as follows (where by $D_x$ is the operating pitch diameter of the element with reference number x in FIG. 5):

$$K=(D_{18/34}/D_{23/26})*(D_{24/27}/D_{19/35})$$

Indeed, the first duo which form the linking mechanism 25 comprises the elements with reference numbers 23/26 and 24/27, whereas the second duo comprises the elements 18/34 and 19/35.

Also in this case the third duo comprises the carrier 22.

Further note that the following relation is valid:

$$D_{18/34}+D_{23/26}=D_{22}=D_{19/35}+D_{24/27}$$

This relation shows how the operating pitch diameter of the carrier 22 can be determined.

Figure 7:
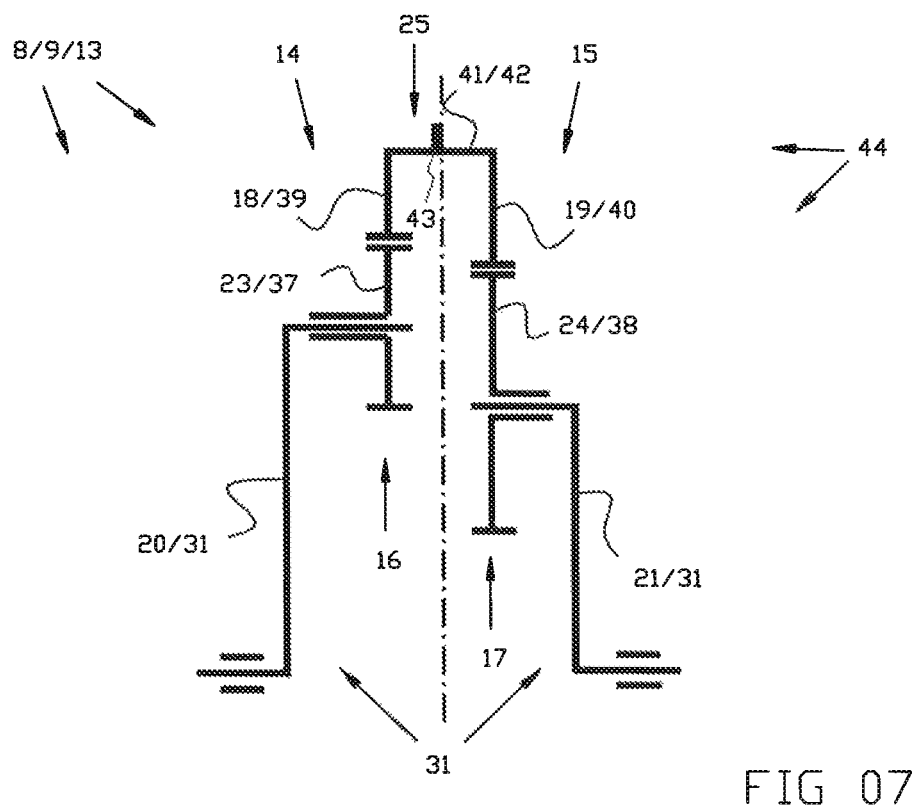
FIG. 7 represents schematically another embodiment of another second stage of a MIMRD in accordance with the present disclosure.

FIG. 7 illustrates still another type of second stage 8 or 9, the first set and the second set of planetary gearing 16 and 17 each comprising a number of planetary gearing elements 37 and 38 which are of a certain other set type, than in the preceding cases.

This time the set type is such that a set comprises a number of separate, simple planetary gearwheels 37 and 38.

Also the first and the second interacting gearing 18 and 19 are of a certain different interacting gearing type, which interacting gearing type is such that the concerned interacting gearing 18 or 19 is a single gearwheel component 39 or 40 of a compound interacting gearwheel 41.

The first and the second interacting gearing 18 and 19 of the second stage 8 or 9 of the MIMRD 1 taken together form in this case a compound ring wheel 42.

The linking mechanism 25 linking the input side 14 to the output side 15 is in this example of FIG. 7 formed by a fixed interconnection 43 of the first and second interacting gearing 18 and 19, forming a compound interacting gearwheel 42, while the first and second set of planetary gearing 16 and 17 are each respectively supported on their own, separated planet carriers 20 and 21.

Therefore, the input side 14 and output side 15 of a second stage 8 or 9 of the MIMRD 1 each comprise an element, which is represented in this case by a planet carrier 20 or 21, forming together a pair 31 of separated, quasi identical, but slightly different elements 20 and 21, so to form a second stage 8 or 9 which is a so-called carrier differential gearing 44.

In this case the pair 31 of separated elements 20 and 21 is a pair of separated planet carriers 20 and 21, each planet carrier 20 or 21 of the pair supporting one of the first and second set of planetary gearing 16 and 17, which are each composed of a number of separate, simple planetary gearwheels 37 and 38, while these first and second set of planetary gearing 16 and 17 are linked by a fixed interconnection 43 of the first and second interacting gearing 18 and 19.

In this case the 'differential gain-K' is calculated as follows (where by $D_x$ is the operating pitch diameter of the element with reference number x in FIG. 5):

$$K=(D_{18/39}/(D_{20/31}-D_{23/37}))*((D_{21/31}-D_{24/38})/D_{19/40})$$

The first duo comprises the elements with reference numbers 18/39 and 19/40. The second duo comprises the element with reference numbers 20/31 and 21/31. The third duo comprises the elements 23/37 and 24/38, i.e. the planet gearings.

Further note that the following relations are valid:

$$D_{18/39}-D_{23/37}=D_{20/31}$$

$$D_{19/40}-D_{24/38}=D_{21/31}$$

Figure 8:
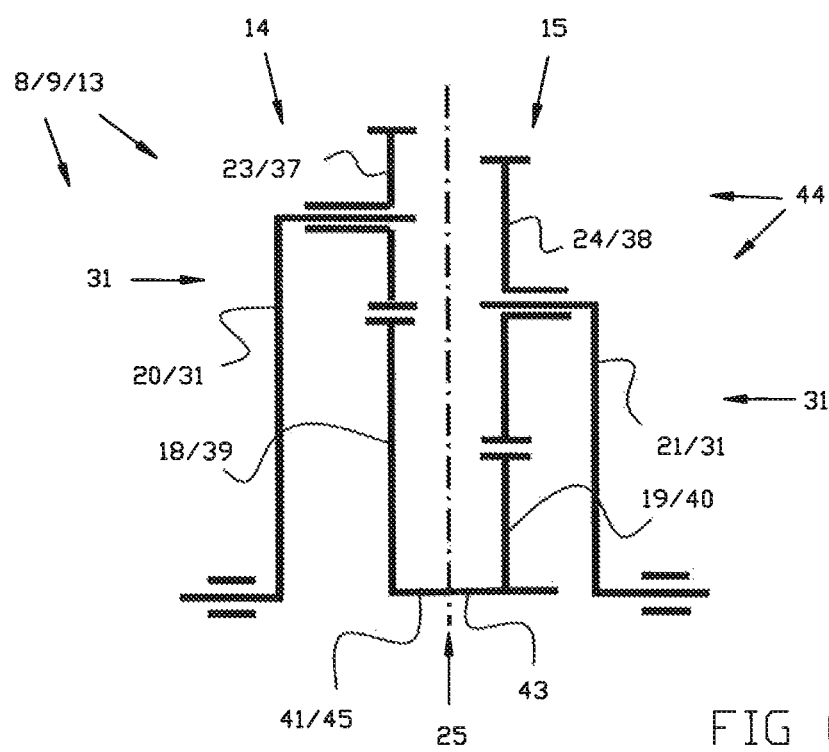
FIG. 8 represents schematically another embodiment of another second stage of a MIMRD in accordance with the present disclosure.

In FIG. 8 a similar carrier differential gearing 44 is illustrated, wherein the first and the second interacting gearing 18 and 19 are again of a certain interacting gearing type, which interacting gearing type is such that the concerned interacting gearing 18 or 19 is a single gearwheel component 39 or 40 of a compound interacting gearwheel 41.

This compound interacting gearwheel 41 is however in this case a compound sun wheel 45.

The modification of the embodiment of a second stage 8 or 9 of a MIMRD 1 represented in FIG. 7 into the embodiment represented in FIG. 8 is therefore somewhat similar as a modification starting from an embodiment as represented in FIG. 5 so to form the embodiment represented in FIG. 6.

In this case the 'differential gain-K' is calculated as follows (where by $D_x$ is the operating pitch diameter of the element with reference number x in FIG. 5):

$$K=(D_{18/39}/(D_{20/31}-D_{23/37}))((D_{21/31}-D_{24/38})/D_{19/40})$$

The first duo comprises the elements with reference numbers 18/39 and 19/40. The second duo comprises the element with reference numbers 20/31 and 21/31. The third duo comprises the elements 23/37 and 24/38, i.e. the planet gearings.

Since in this case the first duo comprises two sun gears, the value $D_{23/39}$ and $D_{24/38}$ is now equal to the negative operational pitch diameter of these elements.

Further note that the following relations are valid:

$$D_{18/39} - D_{23/37} = D_{20/31}$$

$$D_{19/40} - D_{24/38} = D_{21/31}$$

Figure 9:
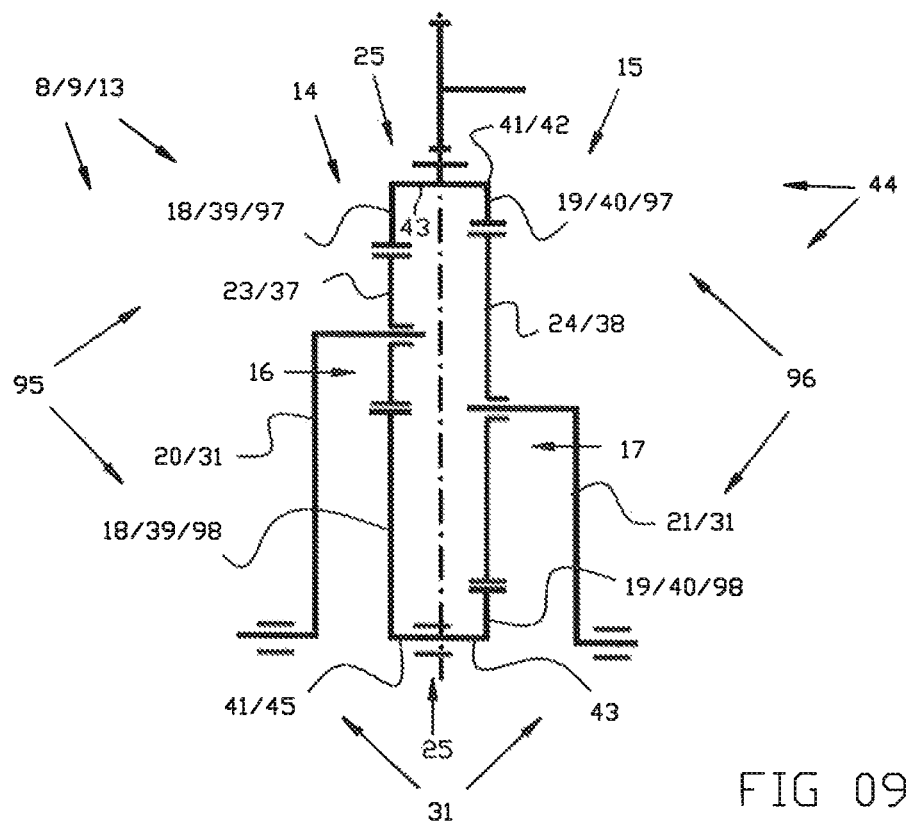
FIG. 9 represents schematically another embodiment of another second stage of a MIMRD in accordance with the present disclosure.

FIG. 9 illustrates still another type of second stage 8 or 9, which can be considered as a combination of the embodiments illustrated in FIGS. 7 and 8.

The input side 14 and output side 15 of the second stage 8 or 9 of the MIMRD 1 each comprise again an element, which is represented by a planet carrier 20 or 21, forming together a pair 31 of separated, quasi identical, but slightly different elements 20 and 21, so to form a second stage 8 or 9 which is again a so-called carrier differential gearing 44.

The first set and the second set of planetary gearing 16 and 17 each comprise a number of planetary gearing elements 37 and 38 which are of a certain set type, this set type being again such that a set comprises a number of separate, simple planetary gearwheels 37 and 38.

This time however, the first and the second interacting gearing 18 and 19 are of a certain different interacting gearing type, since this second stage 8 or 9 comprises the combination of interacting gearing 18 and 19 of the examples of FIGS. 7 and 8.

This means that in the embodiment of FIG. 9 the interacting gearing type is such that the concerned interacting gearing 18 or 19 is each time composed of a pair of gearwheel components 95 or 96.

Hereby, each pair of gearwheel components 95 or 96 is composed of a first single gearwheel component 97, i.e. gearwheel component 39 respectively 40 of a compound ring wheel 42, and a second single gearwheel component 98, i.e. gearwheel component 39 respectively 40 of a compound sun wheel 45.

It is clear that in this embodiment of FIG. 9 the separate, simple planetary gearwheels 37 and 38 of the first set and the second set of planetary gearing 16 and 17 each interact with a pair of gearwheel components 97 and 98 of the interacting gearing 18 and 19 and not anymore with a single gearwheel component 97 or 98 as was the case in the preceding examples of FIGS. 7 and 8.

The first and the second interacting gearing 18 and 19 of the second stage 8 or 9 of the MIMRD 1 taken together form in this case a pair of compound gearwheels 41 composed of a compound ring wheel 42 and a compound sun wheel 45.

The linking mechanism 25 linking the input side 14 to the output side 15 is in this example of FIG. 9 formed by a fixed interconnection 43 of the first and second interacting gearing 18 and 19, forming a pair of compound interacting gearwheels 42 and 45, while the first and second set of planetary gearing 16 and 17 are still each respectively supported on their own, separated planet carriers 20 and 21.

In the case represented in FIG. 9, the compound ring wheel 42 with inner toothing is also provided with outer toothing 86 which interacts with a pinion wheel 87.

Figure 19:
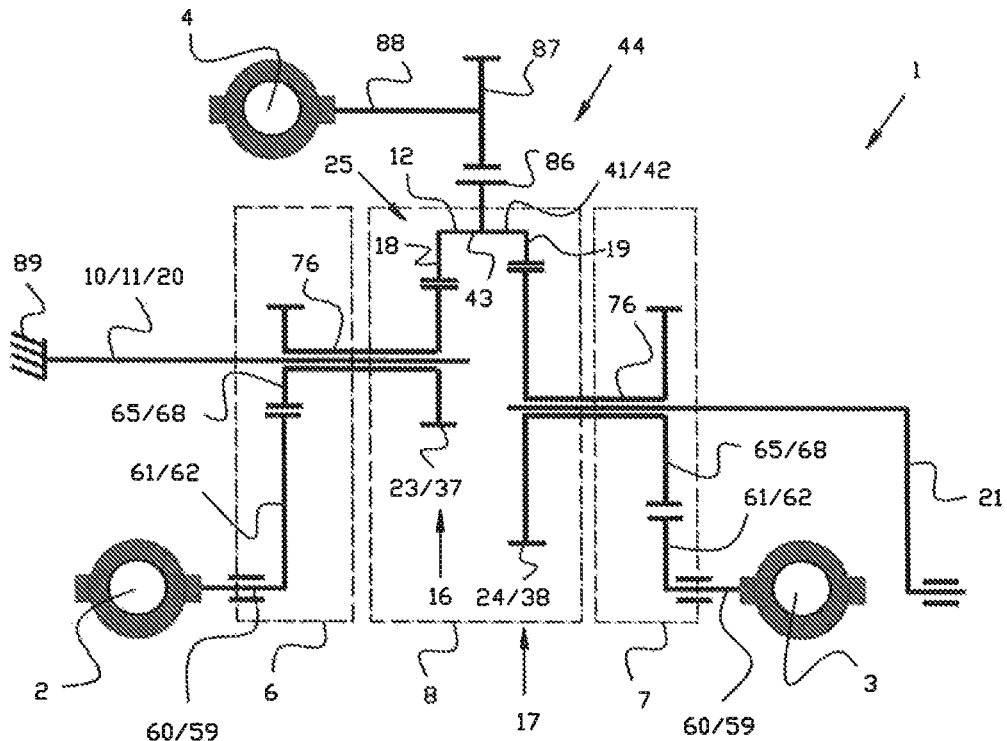
FIG. 19 is a schematic representation of another embodiment of a MIMRD in accordance with the present disclosure.

This pinion wheel 87 can interact with other components of the MIMRD 1 or with other components which are possibly not a part of the MIMRD 1, for example in a way similar to what is the case in FIG. 19.

Figure 10:
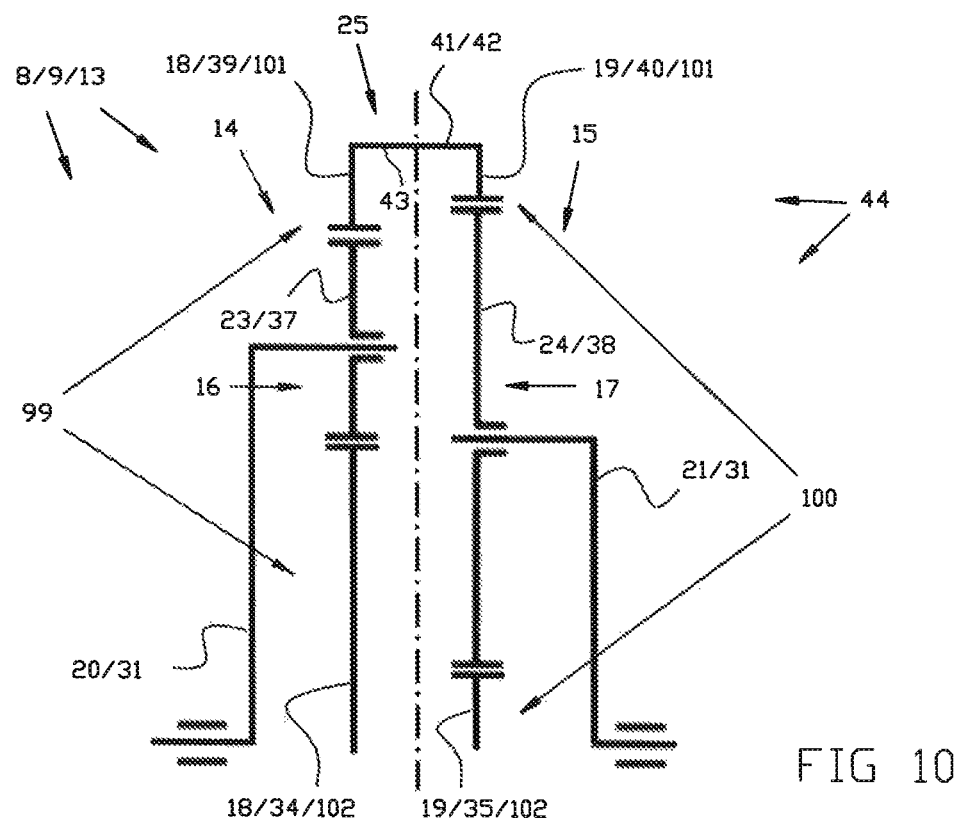
FIG. 10 represents schematically another embodiment of another second stage of a MIMRD in accordance with the present disclosure.

The example illustrated in FIG. 10 of a second stage 8 or 9 of a MIMRD 1 of the present disclosure has a lot of similarities with the preceding example of FIG. 9 in that the second stage comprises again a pair 31 of separated, quasi identical, but slightly different planet carriers 20 and 21.

The linking mechanism 25 linking the input side 14 to the output side 15 of the second stage 8 or 9 is in this example of FIG. 10 also formed by a fixed interconnection 43 of parts of the first and second interacting gearing 18 and 19, while the first and second set of planetary gearing 16 and 17 are each respectively supported on their own, separated planet carriers 20 and 21.

So, the second stage 8 or 9 represented in FIG. 10 also forms again a so-called carrier differential gearing 44.

The interacting gearing 18 and 19 of the second stage 8 or 9 of FIG. 10 has also a similarity with the interacting gearing 18 or 19 represented in FIG. 9 in that they each interact with a number of separated, simple planetary gearwheels, respectively planetary gearwheels 37 and 38, and that the interacting gearing 18 or 19 are each composed of more than a single element, contrary to what was the case in the examples of FIGS. 5 to 8.

Nevertheless, the interacting gearing 18 and 19 are of an interacting gearing type which are this time each a pair of gearwheel elements 99 respectively 100 of which a first gearwheel element 101 is a gearwheel component 39 respectively of a compound interacting gearwheel 41 and a second gearwheel element 102 is a single separate gearwheel 102.

In the case represented in FIG. 10, the first gearwheel element 101 of the pairs of gearwheel elements 99 respectively 100, is each time a gearwheel component 101 of a compound interacting gearwheel 41, in particular a gearwheel component 39 respectively 40 of a compound gearwheel 41 which is a compound ring wheel 42.

Furthermore, the second gearwheel element 102 of the pairs of gearwheel elements 99 respectively 100, is each time a single separate gearwheel 102, in particular a sun wheel 34 respectively a sun wheel 35.

In another equivalent embodiment of a second stage 8 or 9 in accordance with the present disclosure the interacting gearing 18 and 19 could also exist of pairs of gearwheel elements 99 and 100, wherein the first gearwheel element 101 of each pair is a gearwheel component 101 of a compound interacting gearwheel 41, but wherein the compound interacting gearwheel 41 is a compound sun wheel 45.

In such an embodiment the second gearwheel elements 102 of each pair 99 or 100 also form a single separate gearwheel 102 which are however in this case each formed by a ring wheel 29 respectively a ring wheel 30.

In both cases, the first interacting gearing 18 and the second interacting gearing 19 of each second stage 8 and 9 of the MIMRD 1 taken together are a set of gearwheel elements composed of one gearwheel element which is a compound interacting gearwheel 41 and of a pair of gearwheel elements which are each a single separate gearwheel 102.

Figure 11:
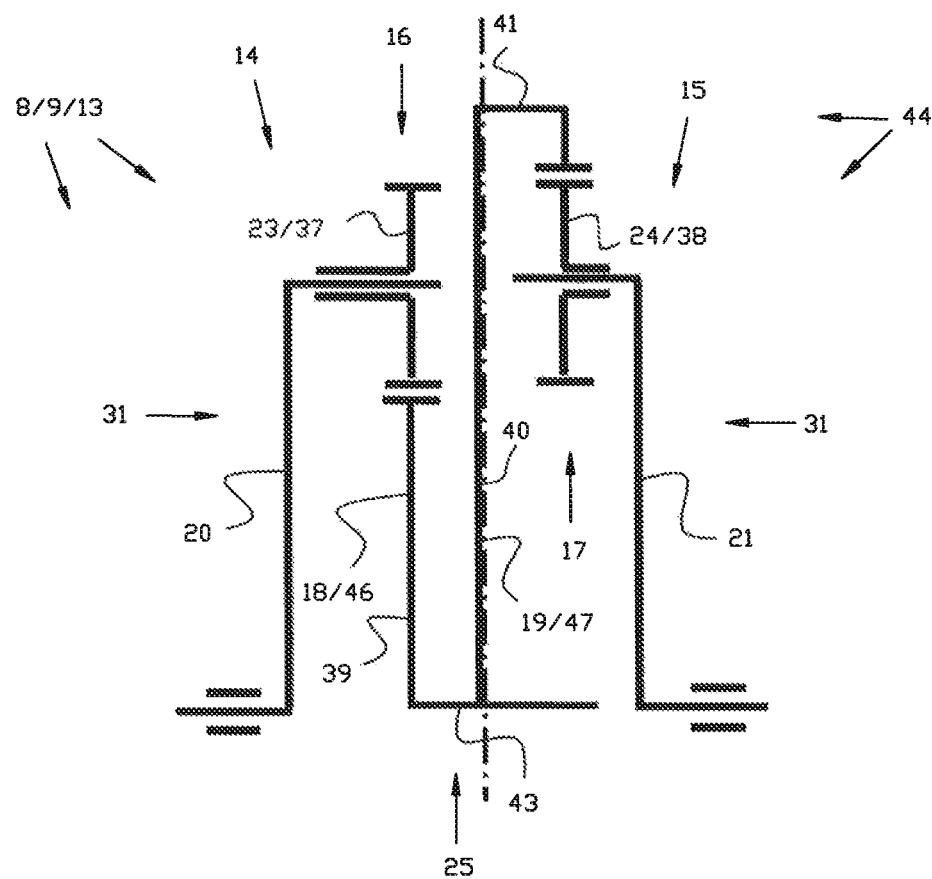
FIG. 11 represents still another embodiment of a second stage of a MIMRD.
Figure 12:
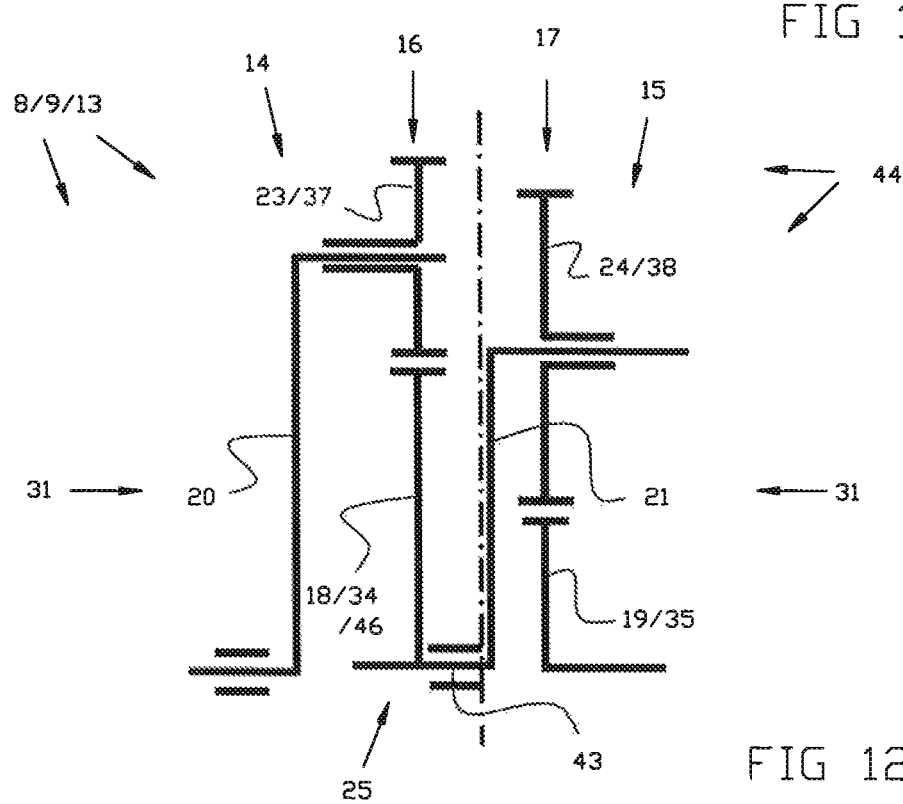
FIG. 12 represents still another embodiment of a second stage of a MIMRD.

FIG. 11 illustrates still another carrier differential gearing 44, which is not claimed as part of the present disclosure.

In this case the first and the second interacting gearing 18 and 19 are again of a certain interacting gearing type, which is such that the concerned interacting gearing 18 or 19 is a single gearwheel component 39 or 40 of a compound interacting gearwheel 41.

The interacting gearing 18 or 19 form a compound interacting gearwheel 41 comprising a sun wheel component 46 and a ring wheel component 47 interconnected to one another or made as a single monolithic piece or they form a combination of a ring wheel 47 and a sun wheel 46 which are fixedly interconnected.

This compound interacting gearwheel 41 is forming the linking mechanism 25 between the input side 14 and the output side 15 of the second stage 8 or 9.

Another possible variation of a second stage 8 or 9 executed as a carrier differential gearing 44, which is not claimed as part of the present disclosure and which is illustrated in FIG. 12, comprises again a pair 31 of separated, quasi identical, but slightly different elements 20 and 21, which are separate planet carriers 20 and 21, each planet carrier 20 or 21 of the pair 31 supporting one of the first and second set of planetary gearing 16 or 17, while these first and second set of planetary gearing 16 and 17 are linked by a fixed interconnection 43 of one of the first and second interacting gearings 18 or 19 with one of the planet carriers 20 or 21.

In the represented example the linking mechanism 25 is formed by a fixed interconnection 43 of the planet carrier 21 and the sun wheel 35, which forms the first interacting gearing 18 and which can also be considered as a sun wheel component 46 of the fixed interconnection 43.

Figure 13:
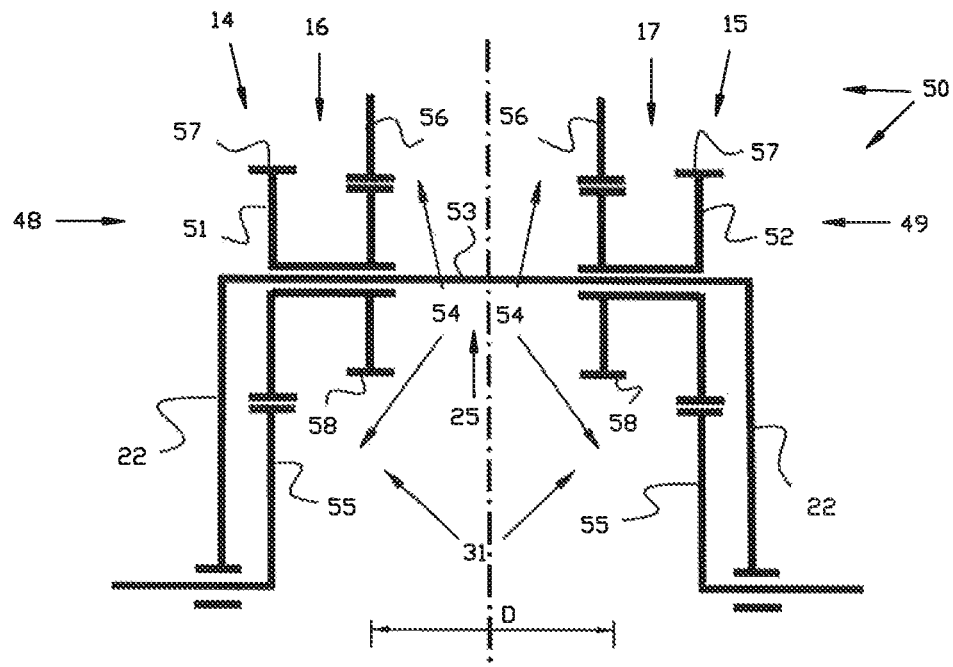
FIG. 13 represents schematically still another embodiment of a second stage of a MIMRD in accordance with the present disclosure.

Still another embodiment of a second stage 8 or 9 of the MIMRD 1 is represented in FIG. 13.

The input side 14 and the output side 15 of the second stage 8 or 9 each comprise this time a set of elements, respectively set of elements 48 and set of elements 49, forming together a pair 31 of separated, quasi identical, but slightly different sets of elements 48 and 49.

This embodiment of a second stage 8 or 9 forms a so-called complex common carrier differential gearing 50, since in this case the pair 31 of sets of elements 48 and 49 is a pair 31 of sets of compound planetary gearwheels 48 and 49, the input side 14 and the output side 15 being linked by a single common planet carrier 22 on which the compound planetary gearwheels 48 and 49 are mounted in a rotatable manner.

Each set of compound planetary gearwheels 48 and 49 represents a set of planetary gearing 16 and 17 of the second stage 8 or 9 which is in this case composed of a number of separate, compound planetary gearwheels 51 and 52 which are disposed circumferentially and spaced from one another on the common supporting planet carrier 22.

The first set of compound planetary gearwheels 48 and the second set of compound planetary gearwheels 49 are separated from one another and mounted in a rotatable manner at a distance D from one another on planet shafts 53 provided on the single, common planet carrier 22.

The linking mechanism 25 is formed by the single common planet carrier 22 which supports the first and second set of planetary gearing 16 and 17, each set respectively being composed of a number of first and second compound planetary gearwheels 51 and 52 which are not fixedly interconnected.

The first interacting gearing 18 and the second interacting gearing 19 are also quite different in this case and are of another interacting gearing type, which is for each interacting gearing 18 or 19 a pair 54 of single, separated gearwheels 55 and 56.

The gearwheels 55 are in this case sun wheels 55, while the gearwheels 56 are ring wheels 56.

As a consequence, the first and the second interacting gearing 18 and 19 taken together consist of two pairs 54 of single, separated gearwheels 55 and 56, each pair being a combination of a ring wheel 56 and a sun wheel 55.

The first interacting gearing 18 consists of a pair 54 of separated gearwheels, i.e. a sun wheel 55 and a ring wheel 56, which respectively interact with first planetary gearwheel components 57 and second planetary gearwheel components 58 of pairs of planetary gearwheel components 57 and 58 by which a compound planetary gearwheel 51 of the first set 48 of compound planetary gearwheels 51 is composed.

Similarly, the second interacting gearing 19 also consists of a pair 54 of separated gearwheels, i.e. a sun wheel 55 and a ring wheel 56, which respectively interact with first planetary gearwheel components 57 and second planetary gearwheel components 58 of pairs of planetary gearwheel components 57 and 58 by which a compound planetary gearwheel 52 of the second set 49 of compound planetary gearwheels 52 is composed.

In the example of FIG. 13, the outermost planetary gearwheel components 57 of the compound planetary gearwheels 51 and 52 respectively at the input side 14 and the output side 15 of the second stage 8 or 9 are the above-mentioned first planetary gearwheel components 57 which are meshing with one of the sun wheels 55, while the innermost planetary gearwheel components 58 of the compound planetary gearwheels 51 and 52 are the above-mentioned second planetary gearwheel components 58 which are interacting with one of the ring wheels 55.

It is of course not excluded from the present disclosure to modify the configuration by interchanging the positions of the interacting gearwheels 55 and 56 and/or the first or second planetary gearwheel components 57 and 58.

In this case, two types of 'differential gain-K' values can be calculated, depending on which elements make up the second duo, i.e. which elements are the output element and the grounded element.

In the first case the 'differential gain-K' is calculated as follows (where by $D_x$ is the operating pitch diameter of the element with reference number x in FIG. 5):

$$K = (D_{56(16)}/D_{58(16)})(D_{58(17)}/D_{56(17)})$$

Whereby '56 (16)' refers to the element 56 of the first set 16 of planetary gearing and so on.

In this case, the third duo comprises the elements with reference numbers 58 (16) and 58 (17), whereas the second duo comprises the elements 56 (16) and 56 (17). The first duo comprises this case the common carrier 22.

Further note that the following relation is valid:

$$D_{56(16)} - D_{58(16)} = D_{22} = D_{56(17)} - D_{58(17)}$$

In the second case the 'differential gain-K' is calculated as follows (where by $D_x$ is the operating pitch diameter of the element with reference number x in FIG. 5):

$$K = (D_{55(16)}/D_{57(16)}) * (D_{57(17)}/D_{55(17)})$$

Whereby '55 (16)' refers to the element 55 of the first set 16 of planetary gearing and so on.

In this case, the third duo comprises the elements with reference numbers 57 (16) and 57 (17), whereas the second duo comprises the elements 55 (16) and 55 (17). The first duo comprises this case the common carrier 22.

Further note that the following relation is valid:

$$D_{55(16)} + D_{57(16)} = D22 = D_{55(17)} + D_{55(17)}$$

In both the afore-mentioned cases, care has to be taken to choose the correct planet gearwheel. Indeed, as in this case the planet gears are a compound planet gearwheels, one has to choose that planet gearwheel of the compound planet gearwheel that interacts with the element of the second duo.

In some embodiments of a MIMRD 1 of the present disclosure each second stage 8 or 9 of the MIMRD 1 is of a type as described before, i.e. of one of the following types:
a) a so-called ring differential gearing 33;
b) a so-called sun differential gearing 36;
c) a so-called carrier differential gearing 44; or,
d) a so-called complex common carrier differential gearing 50.

The second stages 8 or 9 of the MIMRD 1 are the core of the mechanism, but as explained before, at least one and in general two rotatable devices 2 and 3 of the MIMRD 1 are connected to such a second stage 8 or 9 by a first stage 6 or 7, which forms a speed reducing mechanism or a speed increasing mechanism.

Figure 14:
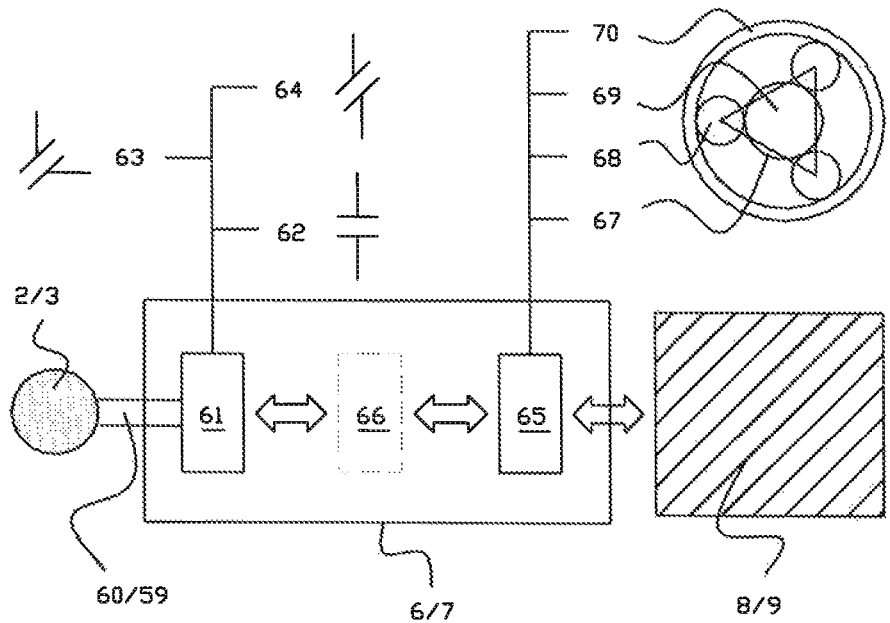
FIG. 14 is a general schematic representation of a first stage of a MIMRD in accordance with the present disclosure.

FIG. 14 shows a kind of block diagram that represents a first stage 6 or 7 which is connected to a rotatable device 2 or 3 and which is connected to or interacting with a second stage 8 or 9.

According to some embodiments of the present disclosure, such a first stage 6 or 7 is of a planetary gear train (PGT) type.

Hereby, the first stage 6 or 7 comprises a first stage input shaft 59 which is interconnected with or formed by an outgoing shaft 60 of a rotatable device 2 or 3 of the MIMRD 1.

On this first stage input shaft 59 a first stage input gearwheel 61 such as a sun wheel 62, a bevel gear 63 or hypoid gearwheel 64 is mounted fixedly.

The first stage 6 or 7 furthermore comprises one or more first stage output elements 65 which interact with the first stage input gearwheel 61 directly or indirectly through an intermediate gear mechanism 66.

These one or more first stage output elements 65 are intended for interaction or interconnection with elements of the concerned second stage 8 or 9.

The one or more first stage output elements 65 can be any element of a typical PGT type first stage 6 or 7, such as a single first stage output sun wheel 67, a set of first stage output planetary gearwheels 68, a single first stage planet carrier 69 or a single first stage output ring wheel 70.

Of course it is not excluded from the present disclosure to apply first stages 8 or 9 which are a speed reducer or speed increaser and which are executed in a completely other way.

In a typical embodiment of a MIMRD 1 of the present disclosure a first stage 6 or 7 of a PGT type is connected to a second stage 8 or 9 by fixedly connecting the one or more first stage output elements 65 to the planetary gearwheels or gearing elements 23 and 24 of the first set 16 of second stage planetary gearing, in particular to the planetary gearing elements 23 of the input side 14 of that second stage 8 or 9.

However, other ways of connecting or realizing interaction between a first stage 6 or 7 and a second stage 8 or 9 of a MIMRD 1 are also not excluded from the present disclosure.

Some more practically elaborated embodiments of MIMRDs 1 in accordance with the present disclosure will now be described by FIGS. 15 to 20.

Figure 15:
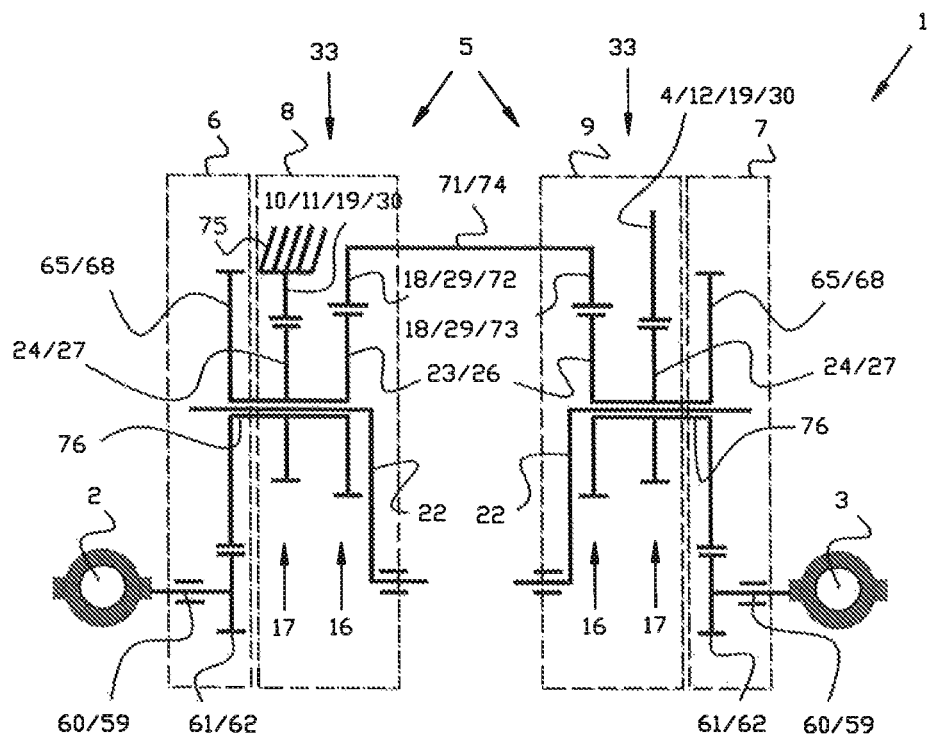
FIG. 15 is a schematic representation of another embodiment of a MIMRD in accordance with the present disclosure.

The first example of FIG. 15 corresponds to the situation described in general terms with respect to FIG. 1.

The MIMRD 1 comprises a pair of second stages 8 and 9, i.e. primary second stage 8 and secondary second stage 9, which are respectively connected to the first rotatable device 2 and the second rotatable device 3 of the MIMRD 1 through a first stage 6 respectively first stage 7 of a pair of first stages 6 and 7 of the MIMRD 1.

In a typical interpretation of the situation of FIG. 15, the first and second rotatable devices 2 and 3 can be intended for driving the gear train 5 of the MIMRD 1 and serve as an input for this gear train 5.

Therefore, the first and second rotatable devices 2 and 3 can for example be an electric actuator, a combustion engine or any other device that can deliver power to the gear train 5.

The third rotatable device 4 is connected to or interacting with the secondary second stage 9 and is in this case typically a device that is driven by the gear train 5 of the MIMRD 1 and forms in that case an output of the gear train 5.

The third rotatable device 4 can for example be a pump, a compressor, a mechanism of a joint in a robot or a prosthesis or any other load that needs to be driven by the first and second rotatable devices 2 and 3 of the MIMRD 1.

Nevertheless, the opposite can also be true and the third rotatable device 4 could for example be a wind turbine which is driven by the wind and which drives the gear train 5 for delivering power to only one of the first and second rotatable devices 2 and 3 or both rotatable devices 2 and 3, which can be for example electric generators for generating electric power, but any other rotatable device serving as a load could also be applied.

In that case the third rotatable device 4 serves as an input for the gear train 5 and the other two rotatable devices 2 and 3 as an output.

The role of being input or output can be taken by any of the rotatable device 2 to 4 and can also change during functioning of the MIMRD 1.

It is also important to understand that any of the rotatable devices 2 to 4 can also serve as a kind of controlling means by which the transmission ratio is set between the other two rotatable devices.

In a possible embodiment of a MIMRD 1 of the present disclosure at any moment during functioning of the MIMRD 1 at least one of the rotatable devices 2 to 4 is providing positive power to the gear train 5 for driving it and at least one other rotatable device 2 to 4 is providing negative power or taking power from the gear train 5.

For example, a MIMRD 1 can be such that at any moment during functioning of the MIMRD 1 positive or negative power is given to the gear train 5 by the third rotatable device 4 and respectively negative or positive power is given to the gear train 5 by the first and second rotatable devices 2 and 3.

Both second stages 8 and 9 are in the example of FIG. 15 of the ring differential gearing type 33, as described with respect to FIG. 5.

These second stages 8 and 9 are linked to one another by a compound stage linking gearwheel 71 of which a first compound stage linking gearwheel component 72 is interacting with one of the sets 16 or 17 of planetary gearing of the primary second stage 8 and of which a second compound stage linking gearwheel component 73 is interacting with one of the sets 16 or 17 of planetary gearing of the secondary second stage 9.

The compound stage linking gearwheel 71 is in this case a compound ring wheel 74.

The compound stage linking gearwheel 71 can of course also be a fixed interconnection of separate gearwheels 72 and 73.

In the example of FIG. 15 the first compound stage linking gearwheel component 72 and the second compound stage linking gearwheel component 73 are meshing with the planetary gearwheel components 26 of the first set 16 of planetary gearing of the corresponding second stages 8 or 9 and they are therefore the first interacting gearing 18 of the concerned second stages 8 and 9.

The planetary gearwheel components 27 of the second set 17 of planetary gearing of the primary second stage 8 are meshing with the ring wheel 30 that is forming the second interacting gearing 19 and which is fixedly mounted in a housing 75 of the MIMRD 1 or which is fixedly connected to a ground 75.

This ring wheel 30 is therefore the first element 10 of the MIMRD 1 which serves as a torque resisting or torque controlling means 11 by being blocked and being fixedly arranged to the surroundings of the MIMRD 1.

The planetary gearwheel components 27 of the second set 17 of planetary gearing of the secondary second stage 9 are meshing with the ring wheel 30, which is forming the second interacting gearing 19 of the secondary second stage 9 and which is fixedly connected to the third rotatable device 4.

As a consequence, this ring wheel 30 of the second set 17 of planetary gearing of the secondary second stage 9 forms, in the terminology of this present disclosure, a second element 12 of the MIMRD 1.

The first and second rotatable devices 2 and 3 are linked to their corresponding second stages 8 and 9 by first stages 6 and 7 which are in this example executed in a complete similar way as PGT type first stages 6 and 7.

These first stages 6 and 7 are fixedly connected on the outgoing shafts 60 of their rotatable device 2 or 3, which shafts 60 also form the first stage input shafts 59.

A first stage input gearwheel 61 in the form of a sun wheel 62 is mounted fixedly on each of these first stage input shafts 59.

In the case of FIG. 15 there is no intermediate gear mechanism 66 and the first stage output elements 65, which are in this case a set of first stage output planetary gearwheels 68, are meshing directly with the first stage input gearwheel 61 or sun wheel 62.

The first stage output planetary gearwheels 68 are connected by a fixed connection 76 to the planetary gearwheels or gearing elements 23 and 24 of the first set 16 and second set 17 of second stage planetary gearing, in particular to the planetary gearing elements 24 of the output side 15 of that second stage 6 or 7.

As a consequence, the first stage output planetary gearwheels 68 of both first stages 6 and 7 are supported in a rotatable manner on the common planet carrier 22 of the concerned second stage 8 or 9.

It is clear that the configuration of FIG. 15 is very symmetrical and can be used as a CVT or IVT.

The torque resisting or torque controlling means 11 is clearly the complement of the third rotatable device 4.

So, when the first and second rotatable devices 2 and 3 turn more or less at the same speed, the third rotatable device 4 will also rotate at a speed similar to the speed of the torque resisting or torque controlling means 11, thus at a speed which is close to zero depending on the degree of symmetry of the configuration.

On the other hand, when the first rotatable device 2 is not turning or turning in an opposite sense compared to the second rotatable device 3, while the second rotatable device 3 is turning at high speed, a high transmission ratio can be easily obtained.

This clarifies a bit the very interesting characteristics of a MIMRD 1 of this present disclosure.

Another important aspect of a MIMRD 1 of the present disclosure as illustrated in FIG. 15, but also in general, is that the planetary gearwheels or gearwheel components 26, 27 and 68 of the MIMRD 1 are each intermeshing with only one other gearwheel.

In that way the concerned gearwheels can be very precisely executed in order to cope with loads exerted in them, resulting in an increased efficiency of the gear train 5.

Figure 16:
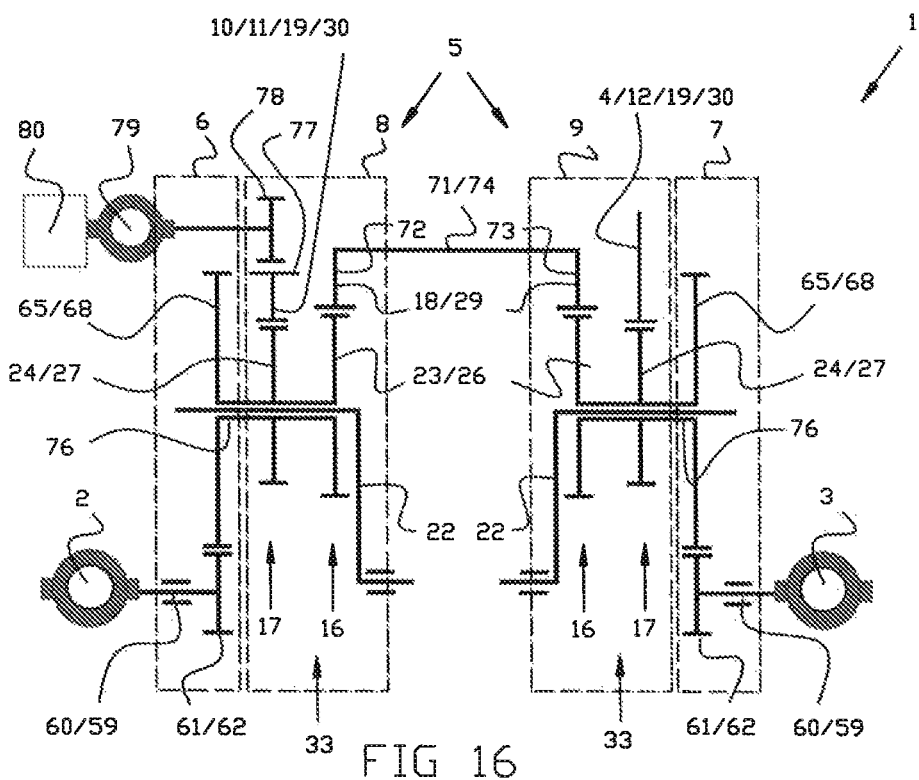
FIG. 16 is a schematic representation of another embodiment of a MIMRD in accordance with the present disclosure.

FIG. 16 illustrates another embodiment of a MIMRD 1 in accordance with the present disclosure, which is exactly the same as the embodiment of FIG. 15, except that the torque resisting or torque controlling means 11 are arranged in a different way.

This time, the ring wheel 30 which forms the second interacting gearing 19 of the primary second stage 8 is still the first element 10 of the MIMRD1, but it is not mounted fixedly in a housing 75 and is not fixedly connected to a ground 75, so that it is still rotatable with respect to such a housing 75 or ground.

Nevertheless, in this example on the outside of this ring wheel 30 an outer toothing 77 is provided which interacts with a pinion 78, which is mounted on the outgoing axis of an actuator or driver 79.

The actuator or driver 79 itself is controlled by a device 80 which can be a simple braking mechanism 80 or a clutch or any more complicated system by which torque and speed of the outgoing axis can be set.

According to the present disclosure the first element is a ring wheel, a sun wheel or a planet carrier which is mounted in a rotatable manner and which is provided with a mechanism comprising a braking mechanism or a clutch which is interacting or can interact with the rotatable ring wheel, sun wheel or planet carrier, whereby the braking mechanism comprises a combination of a motor or actuator and a brake. It is clear that in that way a torque resisting or rather a torque controlling means 11 is obtained that is not just blocking the movement of the ring wheel 30, but which can be used to impede the movement of the ring wheel 30 in a controllable way or even for setting the torque on the ring wheel 30 even in an active way, i.e. by driving the ring wheel by the actuator 79.

Of course, with this configuration of FIG. 16 the possibilities of controlling the interaction between the different rotatable devices 2 to 4 are very much increased.

Figure 17:
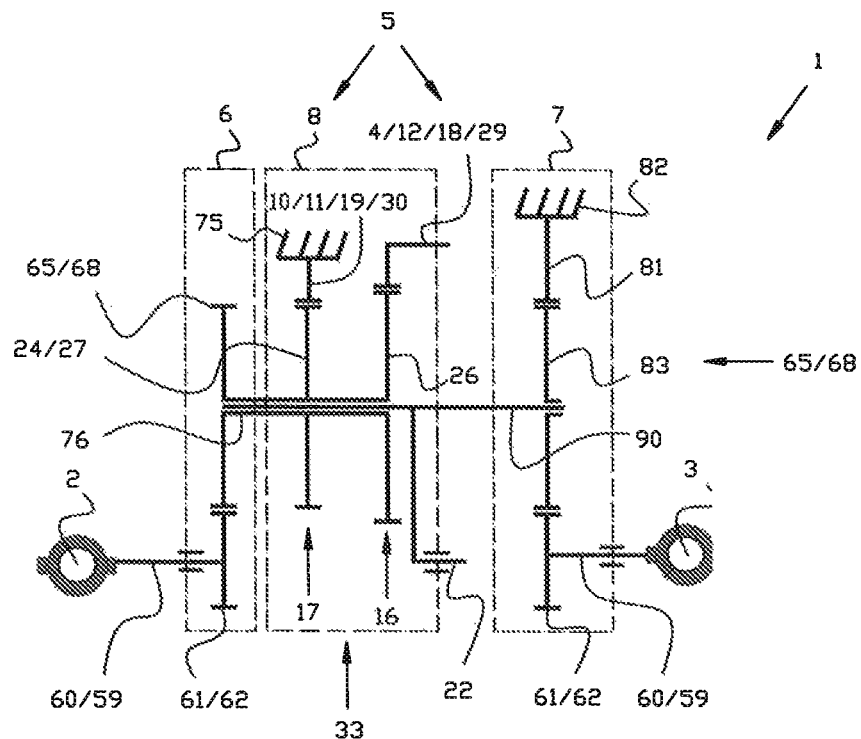
FIG. 17 is a schematic representation of another embodiment of a MIMRD in accordance with the present disclosure.

The embodiment of a MIMRD 1 of the present disclosure illustrated in FIG. 17 is quite different and can be considered as a practical example of the schematic configuration of FIG. 2, since in this case there is only one second stage 8 and the first and second rotatable devices 2 and 3 are connected to this second stage 8 through first stages 6 and 7.

This single second stage 8 is again of the ring differential gearing type 33.

The connection of the first rotatable device 2 with this second stage 8 is identical to what is displayed in FIG. 15.

Since there are no two second stages 8 and 9, there is no need for a compound stage linking gearwheel 71.

For the same reason the third rotatable device 4 can only be connected or be in interaction with the only present second stage 8.

So, in this example the third rotatable device 4 is fixedly connected to the ring wheel 29 which is the first interacting gearing 18 of the second stage 8.

This ring wheel 29 therefore forms the second element 12 of the MIMRD 1 in the terminology of this present disclosure.

The first stage 7 connecting the second rotatable device 3 to the single second stage 8 is also of a PGT type, but it is slightly different.

This first stage 7 is similar to the first stage 6, but comprises additionally a ring wheel 81 which is forming an additional torque resisting or torque controlling means by being fixedly mounted in a housing 82 or to a ground 82.

The ring wheel 81 of this first stage 7 is interacting with each planetary gearwheel 83 of a set of first stage output planetary gearwheels 68 of the first stage 7.

The first stage 7 is linked to the second stage 8 in a different manner than the first stage 6.

In particular, the set of first stage output planetary gearwheels 68 formed by the planetary gearwheels 83 is mounted in a rotatable manner on planet shafts 90 of the common planet carrier 22 of the second stage 8 without being fixedly connected with the corresponding planetary gearwheels 26 or 27 of a set of second stage planetary gearwheels 16 or 17 of the second stage 8, as is on the contrary the case in the other first stage 6.

The second stage 8 is also provided with torque resisting or torque controlling means 11, which are the same as in FIG. 15, a ring wheel 30 being fixedly connected to a housing or ground 75.

This embodiment of a MIMRD 1 of the present disclosure is clearly executed in a somewhat simplified form, if compared with the embodiments of FIGS. 15 and 16.

But one can understand that still a very interesting configuration is obtained by which the interaction between the rotatable devices 2 to 4 can be arranged, certainly as far as controlling the mutual transmission ratio or transmission torque is concerned.

This embodiment is also very interesting in cases where the available space is very limited, such as in joints of prostheses or robotic arms and so on.

Figure 18:
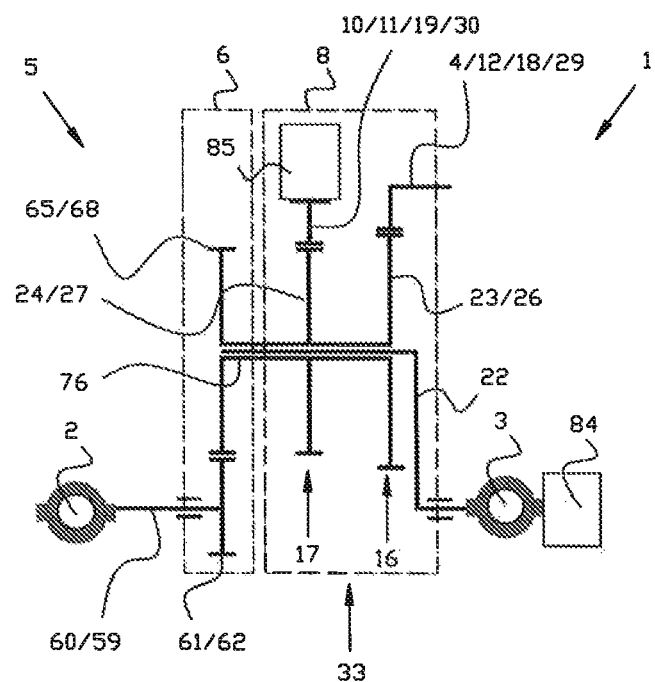
FIG. 18 is a schematic representation of another embodiment of a MIMRD in accordance with the present disclosure.

FIG. 18 illustrates an even still more reduced version of a MIMRD 1 in accordance with the present disclosure, which is a more practical elaboration of the schematic presentation of FIG. 3.

This embodiment of a MIMRD 1 according to the present disclosure is almost the same as the embodiment of FIG. 17.

A first difference however is that the second rotatable device 3 is not connected to the second stage 8 by a first stage 7, but this time the second rotatable device 3 is connected directly to this single second stage 8.

This corresponds indeed with the general representation of FIG. 3.

Actually the second rotatable device 3 is directly driving the common planet carrier 22 of the second stage 8.

The second rotatable device 3 is also provided with a brake 84.

Another difference with the embodiment of FIG. 17 is that in FIG. 18 the ring wheel 30 of the second stage 8 is not connected to the ground or housing 75 but mounted in a rotatable manner.

This ring wheel 30 is however still forming a torque resisting means or torque controlling means 11 in that it is provided with a brake 85 by which its movement can be impeded.

FIG. 19 illustrates still another embodiment of a MIMRD 1 in accordance with the present disclosure.

The MIMRD 1 comprises only one single second stage 8 which is of a carrier differential gearing type 44 having a compound interacting gearing 41 which is a compound ring wheel 42, similar to what was the case in FIG. 7.

This compound ring wheel 42 is provided at the outside with outer toothing 86, which is meshing with a pinion wheel 87 mounted fixedly on an outgoing shaft 88 of the third rotatable device 4.

The compound ring wheel 42 can therefore be considered as the second element 12 of the MIMRD 1.

The first stages 6 and 7 are similar to the first stages 6 and 7 illustrated in FIGS. 15 and 16, with a first stage input gearwheel 61 in the form of a sun wheel 62 that is fixedly mounted on a first stage input shaft 59.

The sun wheel 62 meshes with a set of first stage output planetary gearwheels 68 forming the first stage output elements 65, which are connected to the corresponding set of planetary gearwheels 37 or 38 of the second stage 8 by a fixed interconnection 76 and which are supported in a rotatable manner on the concerned planet carrier 20 or 21.

The planet carrier 20 which supports the first set of planetary gearing 16 of the second stage 8 is fixedly connected to a housing 89 or the ground 89 and is therefore forming the first element 10 of the MIMRD 1 that is forming a torque resisting or torque controlling means 11 of the MIMRD 1.

Figure 20:
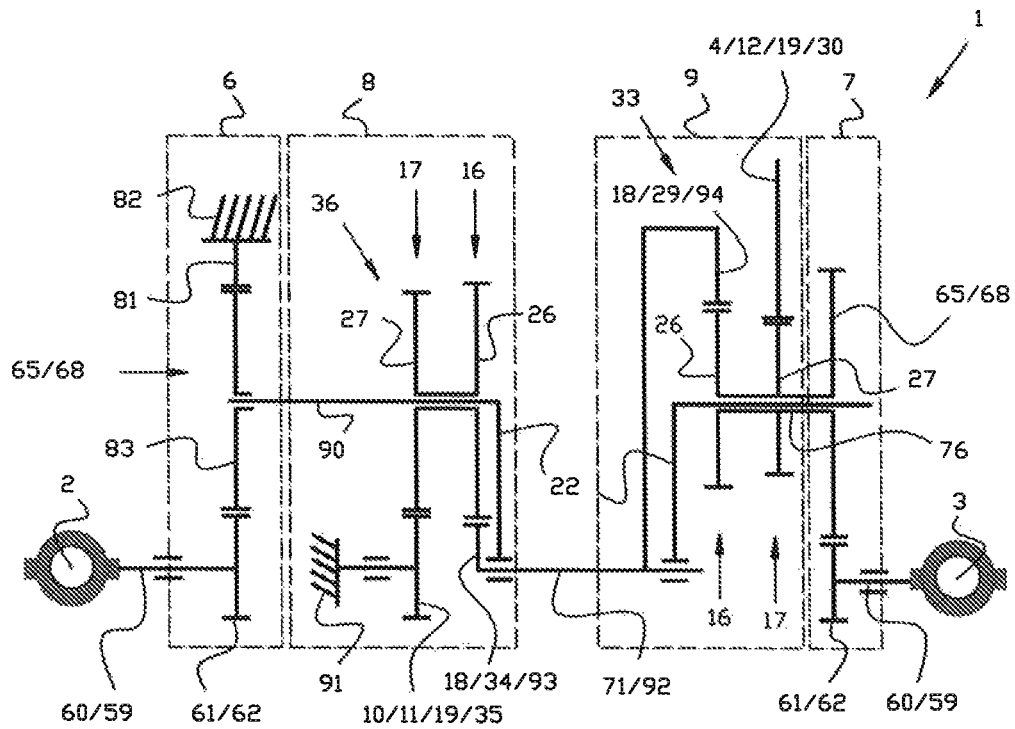
FIG. 20 is a schematic representation of another embodiment of a MIMRD in accordance with the present disclosure.

FIG. 20 illustrates another embodiment of a MIMRD 1 in accordance with the present disclosure, which comprises again two second stages 8 and 9, which are respectively executed as a sun differential gearing 36 and a ring differential gearing 33.

The first rotatable device 2 is linked to the primary second stage 8 by a first stage 6, which is exactly the same as the first stage 7 in FIG. 17 and which is also linked in the same way by having the set of first stage output planetary gearwheels 68 been mounted on planet shafts 90 of the common planet carrier 22 of the primary second stage 8.

The primary second stage 8 is a sun differential gearing having as first and second interacting gearing 18 and 19 a sun wheel 34 and a sun wheel 35.

The sun wheel 35 is fixedly connected to a ground, housing or fixed point 91 and is forming the first element 10 of the MIMRD 1 that is a torque resisting or torque controlling means 11.

The second rotatable device 3 is connected to the secondary second stage 9 by first stage 7 in exactly the same manner as is illustrated in FIG. 15.

The primary second stage 8 and the secondary second stage 9 are however interconnected in another way by a compound stage linking gearwheel 71 which is a compound gearing 92 comprising a sun wheel component 93 and a ring wheel component 94 interconnected to one another or made as a single monolithic piece.

One understands that in still another embodiment of a MIMRD 1 wherein a primary second stage 8 and a secondary second stage 9 are both sun differential gearings 36, the link between these second stages 8 and 9 can be made by a compound stage linking gearwheel 71 which is a compound sun wheel.

Many other embodiments of a MIMRD 1 in accordance with the present disclosure are possible and are not excluded from the present disclosure.

It is also clear that the dimensions, such as heights and lengths, of elements represented in the figures, such as dimensions of planet carriers and gearwheels, are in no way to be considered as a limitation and those elements can have very varying dimensions differing from what is represented in different pictures of the application or elements can have relative dimensions which are different from what is represented in a single picture.

Moreover, it should also be clear that one or more of the afore-mentioned geared elements of the gear train 5, can be designed as roller without teeth.

These geared elements can include, but are not limited to, the planetary gear train system 13, the first set 16 and a second set 17 of planetary gearing, the first and second interacting gearing 18,19 each composed of a number of planetary gearing elements 23,24, the first element 10 being a geared element 30,35 and/or the second element 12 being a gearwheel 29,42.

In this way a rolling contact between these elements is realised instead of a contact by teeth.

Also, when these geared elements are provided with teeth, these teeth can be executed very small.

The present disclosure is in no way limited to the embodiments of a mechanical interconnection of multiple rotatable devices 1 as described above and represented in the drawings, but such a mechanical interconnection of multiple rotatable devices 1 may be realised in different shapes and dimensions, without departure from the scope of the present disclosure.

The invention claimed is:

1. A mechanical interconnection of multiple rotatable devices, comprising:
   a gear train for transmitting or interchanging speed and/or torque between the rotatable devices,
   at least three rotatable devices coupled to the gear train for directly driving an output load through the gear train without intermediate power transfer elements;
   wherein the gear train of the mechanical interconnection of multiple rotatable devices comprises:
   one or more first stages; and
   one or more second stages,
   wherein each of the one or more first stages is coupled to one of the one or more second stages and is configured as either a speed reducer with a gear ratio greater than 1:1 or a speed increaser with a gear ratio smaller than 1:1, serving as a pre-gearing for connecting a first rotatable device and a second rotatable device of the at least three rotatable devices, both being connected to a second stage and at least one of the first rotatable device and the second rotatable device connected to the concerned second stage by the first stage;
   wherein each second stage is a differential gearing comprising a planetary gear train system which is executed in a duplicated form composed of an input side and an output side, comprising respectively a first set of planetary gearing and a second set of planetary gearing, which are structurally mirrored but dimensionally offset to achieve distinct gear ratios,
   wherein the first set of planetary gearing and the second set of planetary gearing together include at least three matched duos of two elements, each of the at least three matched duos consisting of a first element from the first set of planetary gearing and a second element from the second set of planetary gearing,
   wherein each of the first element and the second element of each of the at least three matched duos is either geared element or a planetary carrier,
   wherein the at least three matched duos comprise at least a duo of planet carriers and a duo of planet gears,
   wherein the first set of planetary gearing and the second set of planetary gearing interact respectively with first interacting gearing and the second interacting gearing of respectively the input side and the output side and which the first set of planetary gearing and the second set of planetary gearing are supported in a rotatable manner either each on a separate planet carrier or together on a common planet carrier, each of the first planetary gearing and the second set of planetary gearing being composed of a number of planetary gearing elements which are disposed circumferentially and spaced from one another on their supporting planet carrier, at least a first duo of the at least three matched duos being linked to form a linking mechanism between the first set of planetary gearing and the second set of planetary gearing for transmission of torque and/or speed between the input side and the output side;
   wherein at least a first element, selected from the group consisting of a geared element and a planet carrier, of a second duo of the at least three matched duos of at least one of the second stages is forming a torque resisting or torque controlling means in that it is permanently blocked or impeded in a controllable way or provides a controllable torque to the gear train of the mechanical interconnection of multiple rotatable devices; and,
   wherein a third rotatable device of the at least three rotatable devices is directly driving at least one second element, selected from the group consisting of a geared element and a planetary carrier, of the second duo of at least one of the second stages,
   wherein a differential gain-K, or K, of the operating pitch diameters of the elements of the afore-mentioned at least three duo's fulfils:

$$K \in [0{,}7-1[ \cup ]1-1{,}4];$$

wherein the differential gain-K is defined as:
   K=(D2,a/D1,a)*(D1,b/D2,b) for ring or sun differential gearings,
   wherein:
   D2,a is the operating pitch diameter of the element of the aforementioned second duo belonging to the first set of planetary gearing;
   D1,a is the operating pitch diameter of the element of the aforementioned first duo belonging to the first set of planetary gearing;
   D2,b is the operating pitch diameter of the element of the aforementioned second duo belonging to the second set of planetary gearing;
   D1,b is the operating pitch diameter of the element of the aforementioned first duo belonging to the second set of planetary gearing;
   wherein the differential gain-K is defined as:
   K=(D1,a/(D2,a−D3,b))*((D2,b−D3,b)/D1,b) for carrier differential gearings,
   wherein:
   D2,a is the operating pitch diameter of the element of the aforementioned second duo belonging to the first set of planetary gearing;
   D1,a is the operating pitch diameter of the element of the aforementioned first duo belonging to the first set of planetary gearing;
   D2,b is the operating pitch diameter of the element of the aforementioned second duo belonging to the second set of planetary gearing;
   D1,b is the operating pitch diameter of the element of the aforementioned first duo belonging to the second set of planetary gearing;
   D3,a is the operating pitch diameter of the element of the afore-mentioned third duo belonging to the first set of the planetary gearing when the first duo comprises a set of two rings;
   D3,b is the operating pitch diameter of the element of the afore-mentioned third duo belonging to the second set of the planetary gearing when the first duo comprises a set of two rings;

D3,a is the negative of the operating pitch diameter of the element of the afore-mentioned third duo belonging to the first set of the planetary gearing when the first duo comprises a set of two sun gears;

D3,b is the negative of the operating pitch diameter of the element of the afore-mentioned third duo belonging to the second set of the planetary gearing when the first duo comprises a set of two sun gears;

wherein the differential gain-K is defined as:

K=(D2,a/(D3,b))*((D3,b)/D2,b) for complex carrier differential gearings, wherein:

D2,a is the operating pitch diameter of the element of the aforementioned second duo belonging to the first set of planetary gearing;

D2,b is the operating pitch diameter of the element of the aforementioned second duo belonging to the second set of planetary gearing;

D3,a is the operating pitch diameter of the element of the afore-mentioned third duo belonging to the first set of the planetary gearing, whereby the third duo is a duo of planet gears;

D3,b is the operating pitch diameter of the element of the afore-mentioned third duo belonging to the second set of the planetary gearing, whereby the third duo is a duo of planet gears.

2. The mechanical interconnection of multiple rotatable devices according to claim 1, wherein the first set of planetary gearing and the second set of planetary gearing of a second stage of the mechanical interconnection of multiple rotatable devices are configured in a defined structural arrangement selected from the group consisting of:

a) an arrangement with a number of separate, simple planetary gearwheels;

b) an arrangement with a number of separate, compound planetary gearwheels; or c) an arrangement with a number of planetary gearwheel components of a set of compound planetary gearwheels.

3. The mechanical interconnection of multiple rotatable devices according to claim 1, wherein the first interacting gearing and the second interacting gearing of each second stage of the mechanical interconnection of multiple rotatable devices comprise a gear mechanism selected from:

a) a single, separate gearwheel;

b) a single gearwheel component of a compound interacting gearwheel;

c) a pair of single, separated gearwheels;

d) a pair of gearwheel components of which a first component of the pair of gearwheel components is a ring gear segment and a second component of the pair of gearwheel components is a sun gear segment; or e) a pair of gearwheel components of which a first gearwheel component of the pair of gearwheel components is a gearwheel component of a compound interacting gearwheel and a second gearwheel component of the pair of gearwheel components is a single separate gearwheel.

4. The mechanical interconnection of multiple rotatable devices according to claim 3, wherein the first interacting gearing and the second interacting gearing of each second stage of the mechanical interconnection of multiple rotatable devices taken together are one of the following:

a) a pair of ring wheels or a pair of gearwheel components of a compound ring wheel;

b) a pair of sun wheels or a pair of gearwheel components of a compound sun wheel;

c) two pairs of single, separated gearwheels, each pair being a combination of a ring wheel and a sun wheel;

d) a pair of compound gearwheels composed of a compound ring wheel and a compound sun wheel; or e) a set of gearwheel elements composed of one gearwheel element which is a compound interacting gearwheel and of a pair of gearwheel elements which are each a single separate gearwheel.

5. The mechanical interconnection of multiple rotatable devices according to claim 1, the linking mechanism of a second stage of the mechanical interconnection of multiple rotatable devices is realised in one of the following ways:

a) the linking mechanism is formed by a fixed interconnection of corresponding, constitutive components of the first set of planetary gearing and the second set of planetary gearing forming compound planetary linkage gearwheels which are supported on a single common planet carrier;

b) the linking mechanism is formed by a fixed interconnection of the first interacting gearing and the second interacting gearing, forming a compound interacting gearwheel or a pair of compound interacting gearwheels, while the first set of planetary gearing and the second set of planetary gearing are each respectively supported on separated planet carriers;

c) the linking mechanism is formed by a single common planet carrier which supports the first set of planetary gearing and the second set of planetary gearing, each set respectively being composed of a number of first compound planetary gearwheels and the second compound planetary gearwheels which are not fixedly interconnected; or d) the linking mechanism is formed by a fixed interconnection of a non-common planet carrier of either the input side or the output side with the interacting gearing of the other of said input side and output side.

6. The mechanical interconnection of multiple rotatable devices according to claim 5, wherein in a case in which the input side and the output side of the second stage of the mechanical interconnection of multiple rotatable devices are linked by the compound interacting gearwheel, the compound interacting gearwheel is one of the following:

a) a compound ring wheel;

b) a compound sun wheel; or c) a compound interacting gearing comprising a sun wheel component and a ring wheel component interconnected to one another or made as a single monolithic piece.

7. The mechanical interconnection of multiple rotatable devices according to claim 1, wherein the input side and output side of a second stage of the mechanical interconnection of multiple rotatable devices each comprise an element or set of elements forming together a pair of separated, elements or sets of elements, so to form a second stage which is one of the following:

a) a ring differential gearing in a case in which the pair of elements is a pair of separated ring wheels forming the first interacting gearing and the second interacting gearing, while corresponding components of the first set of planetary gearing and the second set of planetary gearing are fixedly interconnected and are supported on a single, common planet carrier;

b) a sun differential gearing in a case in which the pair of elements is a pair of separated sun wheels forming the first interacting gearing and the second interacting gearing, while corresponding components of the first set of planetary gearing and the second set of planetary gearing are fixedly interconnected and are supported on a single, common planet carrier;

c) a carrier differential gearing in a case in which the pair of elements is a pair of separated planet carriers, each planet carrier of the pair supporting one of the first set of planetary gearing and the second set of planetary gearing, while the first set of planetary gearing and the second set of planetary gearing are linked by a fixed interconnection of the first interacting gearing and the second interacting gearing or of one of the first interacting gearing and the second interacting gearing with one of the planet carriers; or d) a complex common carrier differential gearing in a case in which the pair of sets of elements is a pair of sets of compound planetary gearwheels, the input side and the output side being linked by a single common planet carrier.

8. The mechanical interconnection of multiple rotatable devices according to claim 7, wherein the concerned second stage is a complex common carrier differential gearing, wherein the first set of planetary gearing is executed as a first set of compound planetary gearwheels and the second set of planetary gearing is executed as a second set of compound planetary gearwheels, wherein the first set of compound planetary gearwheels and the second set of compound planetary gearwheels are separated from one another and mounted in a rotatable manner at a distance from one another on planet shafts provided on the single, common planet carrier, wherein the first interacting gearing consists of a pair of separated gearwheels, the pair of separated gearwheels being a sun wheel and a ring wheel, which respectively interact with first planetary gearwheel components and second planetary gearwheel components of pairs of planetary gearwheel components by which a compound planetary gearwheel of the first set of compound planetary gearing is composed and wherein the second interacting gearing consists of a pair of separated gearwheels, the pair of separated gearwheels being a sun wheel and a ring wheel, which respectively interact with first planetary gearwheel components and second planetary gearwheel components of pairs of planetary gearwheel components by which a compound planetary gearwheel of the second set of compound planetary gearing is composed.

9. The mechanical interconnection of multiple rotatable devices according to claim 1, wherein the first stage is a planetary gear train comprising at least:

a first stage input shaft which is interconnected with or formed by an outgoing shaft of a rotatable device of the mechanical interconnection of multiple rotatable devices and on which a first stage input gearwheel is mounted fixedly, the first stage input gearwheel being one of a sun wheel, bevel gear or hypoid gearwheel; and one or more first stage output elements which interact with the first stage input gearwheel directly or indirectly through an intermediate gear mechanism and which configured for interaction or interconnection with elements of a second stage.

10. The mechanical interconnection of multiple rotatable devices according to claim 9, wherein the one or more first stage output elements are one of the following:

a) a single first stage output sun wheel of the planetary gear train first stage;

b) a set of first stage output planetary gearwheels of the planetary gear train first stage;

c) a single first stage planet carrier of the planetary gear train first stage; or d) a single first stage output ring wheel of the planetary gear train first stage.

11. The mechanical interconnection of multiple rotatable devices according to claim 9, wherein the first stage of a planetary gear train is connected to a second stage by fixedly connecting the one or more first stage output elements to the planetary gearwheels or gearing elements of the first set of second stage planetary gearing, in particular to the planetary gearing elements of the input side of that second stage.

12. The mechanical interconnection of multiple rotatable devices according to claim 9, wherein the first stage of a planetary gear train comprises additionally a ring wheel which is forming additional torque resisting or torque controlling means by being fixedly mounted in a housing or to a ground or being impeded in a controllable way and which is interacting with each planetary gearwheel of a set of first stage output planetary gearwheels and wherein the first stage of a planetary gear train is linked to a second stage by having the planetary gearwheels of the set of first stage output planetary gearwheels been mounted in a rotatable manner on planet shafts:

a) of a planet carrier of the second stage without being fixedly connected with the corresponding planetary gearwheels of a set of second stage planetary gearwheels of that second stage, or b) of a planet carrier of the concerned first stage which is fixedly connected to a sun wheel of the concerned second stage.

13. The mechanical interconnection of multiple rotatable devices according to claim 9, wherein the first stage of a planetary gear train comprises a planet carrier which is a first stage output planet carrier and which is fixedly mounted on a gear wheel of the second stage that is interacting with the first set of planetary gearing or the second set of planetary gearing of that second stage.

14. The mechanical interconnection of multiple rotatable devices according to claim 1, wherein the mechanical interconnection of multiple rotatable devices comprises a pair of second stages, the pair of second stages including a primary second stage and a secondary second stage, which are respectively connected to the first rotatable device and the second rotatable device of the mechanical interconnection of multiple rotatable devices through a first stage of a pair of first stages of the mechanical interconnection of multiple rotatable devices, wherein the second stages are linked to one another in one of the following ways:

a) by a compound stage linking gearwheel of which a first compound stage linking gearwheel component is interacting with one of the sets of planetary gearing of the primary second stage and of which a second compound stage linking gearwheel component is interacting with one of the sets of planetary gearing of the secondary second stage; or b) by interconnection of a gear wheel of the primary second stage which interacts with a set of planetary gearing of that primary second stage and a planet carrier of the secondary second stage of that pair of second stages.

15. The mechanical interconnection of multiple rotatable devices according to claim 14, wherein the other set of planetary gearing of the primary second stage is interacting with a gearwheel which is forming a torque resisting or torque controlling means and wherein a set of planetary gearing of the secondary second stage is interacting with the third rotatable device.

16. The mechanical interconnection of multiple rotatable devices according to claim 1, wherein the mechanical interconnection of multiple rotatable devices is executed in a symmetrical way with exception of the first element and the third rotatable device or a non-symmetrical way.

17. The mechanical interconnection of multiple rotatable devices according to claim 1, wherein the first element is forming a torque resisting or torque controlling means, which is a ring wheel, a sun wheel or a planet carrier which is fixedly connected to a housing of the mechanical interconnection of multiple rotatable devices, to the ground or to any fixed point.

18. The mechanical interconnection of multiple rotatable devices according to claim 1, wherein the first element is a ring wheel, a sun wheel or a planet carrier which is mounted in a rotatable manner and which is provided with a mechanism comprising a braking mechanism or a clutch which is configured to interact with the rotatable ring wheel, sun wheel or planet carrier.

19. The mechanical interconnection of multiple rotatable devices according to claim 1, wherein at any moment during functioning of the mechanical interconnection of multiple rotatable devices at least one of the rotatable devices is providing positive power to the gear train for driving it and at least one other rotatable device is providing negative power or taking power from the gear train.

20. The mechanical interconnection of multiple rotatable devices according to claim 19, wherein at any moment during functioning of the mechanical interconnection of multiple rotatable devices positive or negative power is given to the gear train by the third rotatable device and respectively negative or positive power is given to the gear train by the first rotatable device and the second rotatable device.

* * * * *